US011600830B2

(12) United States Patent
Han et al.

(10) Patent No.: US 11,600,830 B2
(45) Date of Patent: *Mar. 7, 2023

(54) PLATE MEMBER FOR A CELL STACK

(71) Applicant: Temasek Polytechnic, Singapore (SG)

(72) Inventors: Ming Han, Singapore (SG); Yunzhong Chen, Singapore (SG); Lei Wang, Singapore (SG); Chun Yu Ling, Singapore (SG)

(73) Assignee: Temasek Polytechnic, Singapore (SG)

( * ) Notice: Subject to any disclaimer, the term of this patent is extended or adjusted under 35 U.S.C. 154(b) by 232 days.

This patent is subject to a terminal disclaimer.

(21) Appl. No.: 17/005,481

(22) Filed: Aug. 28, 2020

(65) Prior Publication Data

US 2020/0395621 A1 Dec. 17, 2020

Related U.S. Application Data

(63) Continuation-in-part of application No. 15/571,845, filed as application No. PCT/SG2016/050201 on Apr. 29, 2016, now Pat. No. 10,763,518.

(30) Foreign Application Priority Data

May 4, 2015 (SG) .......................... 10201503476Q

(51) Int. Cl.
*H01M 8/0254* (2016.01)
*H01M 8/0258* (2016.01)
*H01M 8/1004* (2016.01)

(52) U.S. Cl.
CPC ....... *H01M 8/0254* (2013.01); *H01M 8/0258* (2013.01); *H01M 8/1004* (2013.01)

(58) Field of Classification Search
CPC .. H01M 8/0254; H01M 8/0258; H01M 8/026; H01M 8/1004; H01M 8/2483; Y02E 60/50
See application file for complete search history.

(56) References Cited

U.S. PATENT DOCUMENTS

| 5,750,281 | A | 5/1998 | Washington et al. |
| 6,322,919 | B1 | 11/2001 | Yang et al. |
| 7,678,488 | B2 | 3/2010 | Franklin et al. |
| 8,470,489 | B2 | 6/2013 | Jones |
| 2004/0023090 | A1 | 2/2004 | Pearson et al. |
| 2011/0293982 | A1 | 12/2011 | Martz et al. |
| 2014/0220473 | A1 | 8/2014 | Cole et al. |

FOREIGN PATENT DOCUMENTS

EP 2759011 A2 7/2014
JP 61128469 A 6/1986

*Primary Examiner* — Victoria H Lynch

(57) ABSTRACT

A plate member for a cell stack, a cell stack assembly, a method of forming a plate member for a cell stack and a method of assembling a cell stack may be provided, and the plate member includes a channel sheet with at least one peak and one trough for forming fluid flow channels; two alignment parts, each alignment part including a main body and one or more alignment members or holes, the main body having a through hole provided within the main body; and wherein the alignment part is capable of aligning the channel sheet parallel to a plane of the main body and the alignment member is capable of aligning the alignment member to another corresponding alignment member along an axis passing through the alignment member; and further wherein the channel sheet is disposed between the two alignment parts.

20 Claims, 17 Drawing Sheets

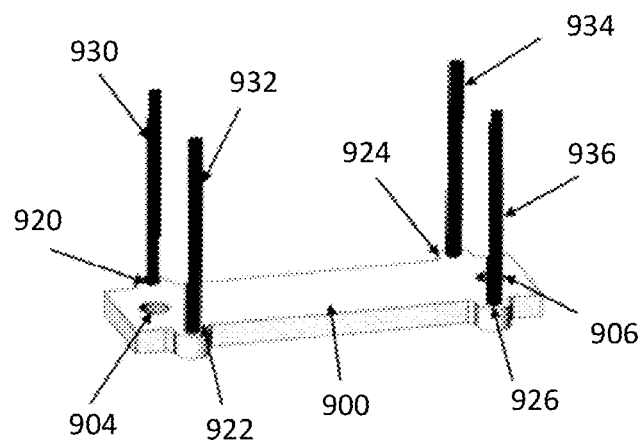
FIG. (9A)
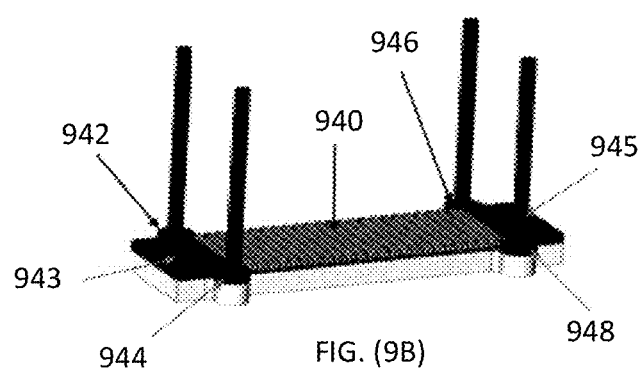
FIG. (9B)
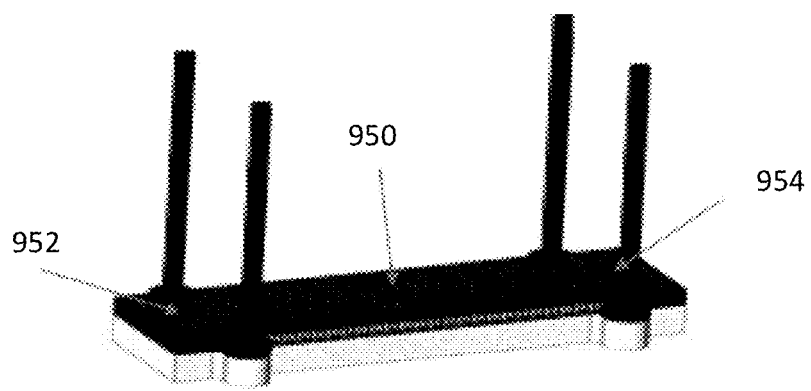
FIG. (9C)

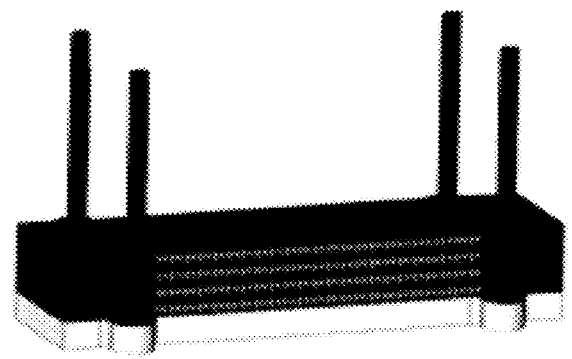
FIG. (9D)
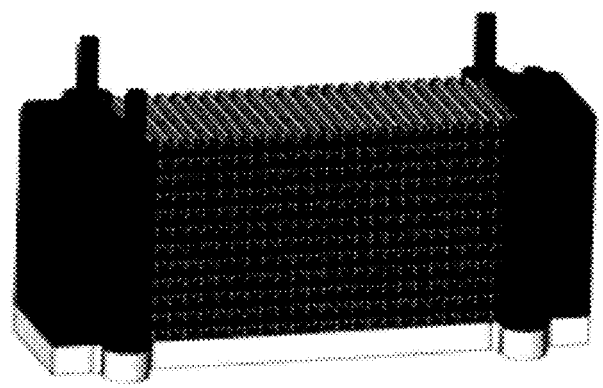
FIG. (9E)
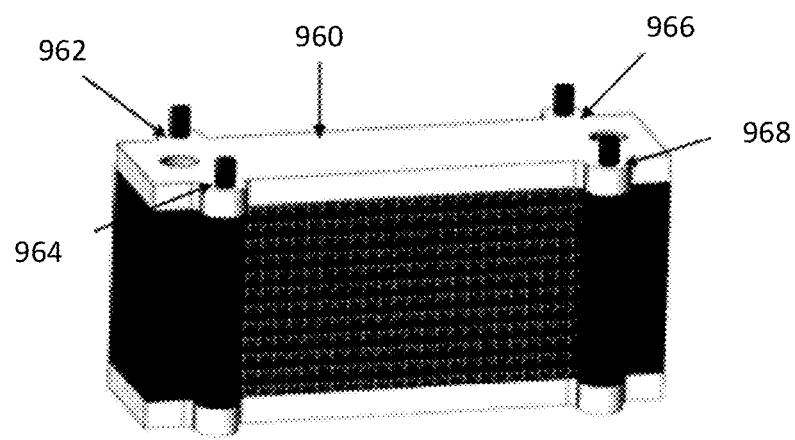
FIG. (9F)

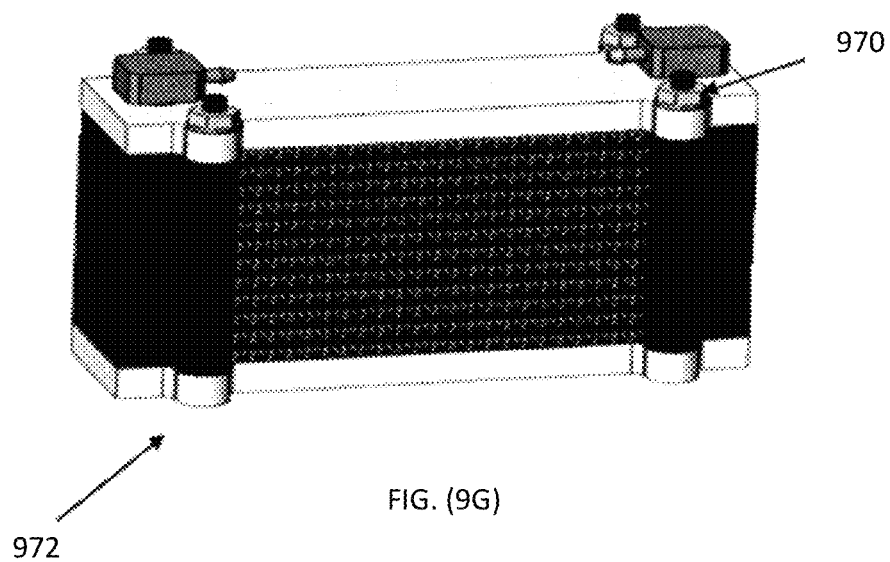
FIG. (9G)

PLATE MEMBER FOR A CELL STACK

CROSS-REFERENCE TO RELATED APPLICATIONS

This application is a continuation-in-part of co-pending U.S. patent application Ser. No. 15/571,845, filed on Nov. 5, 2017, which is a 371 US national application of PCT International Application Ser. No. PCT/SG2016/050201, filed on Apr. 29, 2016, which also claims the benefit of a SG Patent Application No. 10201503476Q, filed on May 4, 2015. The disclosure of all of which is herein incorporated by reference in their entirety for all purposes.

TECHNICAL FIELD

The present disclosure relates broadly to a plate member for a cell stack and to a method of forming a plate member for a cell stack.

BACKGROUND

In current technology, fuel cell components are increasingly being integrated to simplify the stack assembly procedures and for cost savings. For example, a typical Membrane Electrode Assembly (MEA) with five layers are typically used. The MEA with five layers includes one layer of Proton Exchange Membrane (PEM) sandwiched or disposed between two layers of dispersion mediums, with one layer of catalyst located each in the two interfaces between the PEM and the dispersion mediums. This arrangement integrates the membrane, the electrodes and the diffusion mediums and thus simplifies a stack assembly of the MEA.

However, there are other developments regarding one other significant component of a stack which is the bipolar plate.

In the PEM fuel cell industry, materials used have significantly improved. Conventional graphite bipolar plates are gradually replaced by metallic bipolar plates, which can be made relatively thin and thus, reducing weight and dimensions, as well as improving the power density of the stack. This is particularly advantageous for portable fuel cells and mobile usage.

The usage of metallic bipolar plates introduces a number of new challenges. As the metallic bipolar plates are typically made into corrugated form with at least one peak and one trough, a separator sheet is used to form air flow channels and to prevent hydrogen flow in the dispersion medium from contacting with air. The sealing of the hydrogen flow channels formed by apertures on the two ends of a stack is one challenge, particularly when corrugated sheets are used. The alignment of the corrugated sheet, the separator sheet and the MEA is another challenge.

The apertures of the constituent parts of a fuel cell, that is, a bipolar plate, a MEA, a corrugated sheet and a separator sheet are desired to be well sealed and aligned. When assembled, these parts form a continuous cylindrical shaped cavity within the fuel cell and function as an internal manifold. Hydrogen gas passes through this manifold and is distributed evenly to the respective cells. Excess hydrogen, when purged from the cells, exit through another manifold of similar arrangement.

It has been recognised that poor alignment of all the apertures within the fuel cell (i.e. between the bipolar plate, the MEA, the corrugated sheet and the separator sheet etc.) results in flow impediment of hydrogen gas. This lowers the performance of the stack due to reduced fuel intake. Additionally, poor alignment also causes non-uniform distribution of hydrogen gas to each of the cells in the stack and this results in not only lower overall power output but also poor durability due to uneven voltage and thermal distribution.

It has been recognised that the apertures in both ends of the stack are not sufficient for proper alignment. As discussed, poor alignment compromises both the aesthetic appeal of the stack and also the power output performance.

In addition, the corrugated sheet used is typically coated with precious metals, such as gold or silver, and is therefore relatively expensive. However, the areas near the two ends of the stack are typically not active areas that directly involving cell reactions and thus constitute a waste of the corrugated sheet material.

Furthermore, it has been recognised that the assembly procedure of current stacks is complex due to the tight sealing requirements.

In one currently known example, MEAs are aligned within a stack assembly. The stack is an electrochemical device including a fuel cell, a compressor and an electrolyzer. A close cathode system is used in the stack assembly. Thus, a frame is used to position the MEA and separator plates. The MEA is enclosed completely in the body of the frame. Sealing arrangements, for example bead arrangement or elastomeric seals, are needed around the perimeter of the bipolar plate. Bridges are arranged at a periphery of an opening at two ends of the frame to abut against a positioning device. These requirements of sealing and bridges add to the complexity during manufacturing. In addition, strict tolerances also need to be followed during the manufacturing process to ensure that the MEA is enclosed in the frame. Furthermore, the stack assembly in the example is not secure as the frame of the bipolar plate merely rests against two positioning devices.

In another currently known example, a corrugated plate is attached to a base plate with adhesives. However, it has been recognised that when adhesives are used, there are several degrees of freedom during the manufacturing process. It is therefore typical that a tolerance limit for placement is exceeded during the manufacturing process and alignment defects appear.

In yet another currently known example, a repeater unit is used in a solid oxide fuel cell. A frame and a separator in the repeater unit establish a plurality of fuel flow path and duct houses. The ridged holes of the conduits and the separator are positioned to align a stack of the repeater units. The repeater units are firstly stacked without any secure point. Therefore, there is a problem that the stacked repeater units are typically not aligned properly.

In yet another currently known example, a bipolar plate is used in a molten carbonate fuel cell (MCFC). The MCFC is operated in a temperature higher than the melting point of electrolyte materials. The bipolar plate includes a plurality of projection parts to adhere the bipolar plate to a masking plate to hold a current collector between the bipolar plate and the masking plate. A frame is used to position the MEA and separator plates. The MEA is enclosed completely in the body of the frame. Coupling arrangements, for example projections and penetration holes arrangement, are needed around the perimeter of the bipolar plate. This requirement of projections and penetration holes add to the complexity during manufacturing. In addition, strict tolerances also need to be followed during the manufacturing process to ensure that the MEA is enclosed in the frame.

Therefore, there exists a need for a plate member for a cell stack and a method of forming a plate member for a cell stack that seek to address at least one of the above problems.

SUMMARY

In one embodiment, a plate member for an open cathode fuel cell stack includes a corrugated channel sheet with opposing first and second side edges and opposing first and second end edges. The corrugated channel sheet includes peaks and troughs extending from the first side edge to the second side edge, the troughs and the peaks form flow channels with openings at the first and second side edges, and the corrugated channel sheet includes a corrugated channel sheet height H. The plate member further includes first and second alignment parts, and the first and second alignment parts each includes a main body having a through hole, extensions on sides of the main body, and an extension includes an alignment hole. The first and second alignment parts each further includes an alignment part thickness T which is slightly lesser than the corrugated channel sheet height H, and the main body includes an end engagement edge and the extensions include side engagement edges. The first alignment part is disposed at the first end edge of the corrugated channel sheet and the second alignment part is disposed at the second end edge of the corrugated channel sheet. The alignment parts are made of a rigid material which constrain the thickness of the plate member during assembly of a fuel cell stack comprising a plurality of plate members.

In another embodiment, a method of forming an open cathode fuel cell stack includes providing a plurality of plate members and a plate member includes a corrugated channel sheet with opposing first and second side edges and opposing first and second end edges. The corrugated channel sheet includes peaks and troughs extending from the first side edge to the second side edge, the troughs and the peaks form flow channels with openings at the first and second side edges, and the corrugated channel sheet includes a corrugated channel sheet height H. The plate member further includes first and second alignment parts, and the first and second alignment parts each includes a main body having a through hole, extensions on sides of the main body and each extension includes an alignment hole, an alignment part thickness T which is slightly lesser than the corrugated channel sheet height. The main body includes an end engagement edge and the extensions include side engagement edges. The first alignment part is disposed at the first end edge of the corrugated channel sheet and the second alignment part is disposed at the second end edge of the corrugated channel sheet, and the end engagement edge and the side engagement edges of the first and second alignment parts enable a tight fit of first and second end edge portions of the corrugated channel sheet to the first and second alignment parts. The method further includes assembling the plurality of plate members into a stack which includes providing alignment posts through which the alignments holes of the plate members are passed through and applying a compressive force on the stack of plate members. The alignment parts constrain the thickness of the plate member during assembly of the stack to avoid damaging the corrugated channel sheets of the plate members.

In another embodiment, a method of forming a plate member for an open fuel cell stack includes providing a corrugated channel sheet with opposing first and second side edges and opposing first and second end edges. The corrugated channel sheet includes peaks and troughs extending from the first side edge to the second side edge. The troughs and the peaks form flow channels with openings at the first and second side edges. The method further includes providing first and second alignment parts, the first and second alignment parts each includes a main body having a through hole, extensions on sides of the main body, and an extension includes an alignment hole. The main body includes an end engagement edge and the extensions include side engagement edges. The method further includes mating the end engagement edge of the first alignment part to the first end edge of the corrugated channel sheet, and mating the end engagement edge of the second alignment part to the second end edge of the corrugated channel sheet.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

Exemplary embodiments of the invention will be better understood and readily apparent to one of ordinary skill in the art from the following written description, by way of example only, and in conjunction with the drawings, in which:

FIGS. 9A to 9G are schematic drawings for illustrating the steps of assembling a fuel cell stack assembly in an exemplary embodiment.

DETAILED DESCRIPTION

Exemplary embodiments described herein are applicable to fuel cell technology and may provide a plate member for a cell stack. For example, a bipolar plate may be provided which can simplify an assembly procedure of a Proton Exchange Membrane Fuel Cell (PEMFC) stack, improve the stack performance and reduce manufacturing cost.

Figure 1:
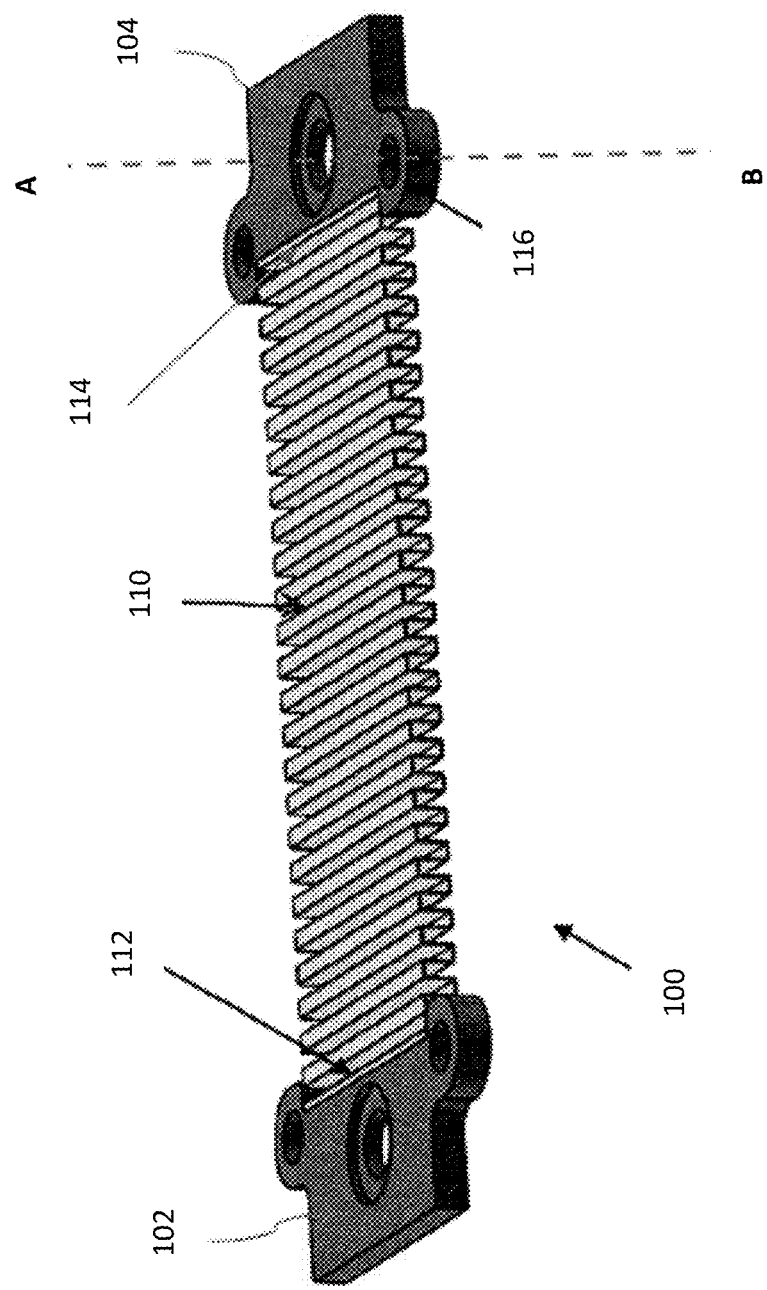
FIG. 1 is a front perspective view of a plate member for a cell stack in an exemplary embodiment.

FIG. 1 is a front perspective view of a plate member for an open cathode cell stack in an exemplary embodiment. In the exemplary embodiment, the plate member 100 includes two alignment parts 102, 104 and a channel sheet 110. In the exemplary embodiment, the channel sheet 110 includes at least one peak and one trough in the body of the sheet and is in the form of a corrugated sheet 110. In one embodiment, the corrugated sheet is made from thin foil of SLS, aluminium, titanium or other alloys. Other types of materials may also be used. The corrugated sheet 110 is coupled to the first alignment part 102 at a first end or edge 112 of the corrugated sheet 110 and to the second alignment part 104 at a second end or edge 114 of the corrugated sheet 110. Therefore, the corrugated sheet 110 is disposed between the first and second alignment parts 102, 104.

In the example embodiment, each alignment part includes a main body and one or more alignment members e.g., 116. The main body is provided with a through hole within the main body. In one embodiment, the alignment part is formed of a rigid material. In one embodiment, the alignment part is formed of a rigid material which is resistant to compression force. The rigid material, for example, may be a rigid plastic material which is resistant to compression force. Other types of rigid materials, such as reinforced fiberglass, ceramic matrix composites, may also be employed.

In the example embodiment, the alignment part is able to align the corrugated sheet 110 parallel to a plane of the main body, and the alignment member e.g., 116 of the alignment part is able to align to another corresponding alignment member (not shown) along an axis AB passing through the alignment member. For example, the alignment member may align with an alignment member of another alignment part or an end plate stacked either on a top or a bottom surface of the alignment part.

Figure 2A:
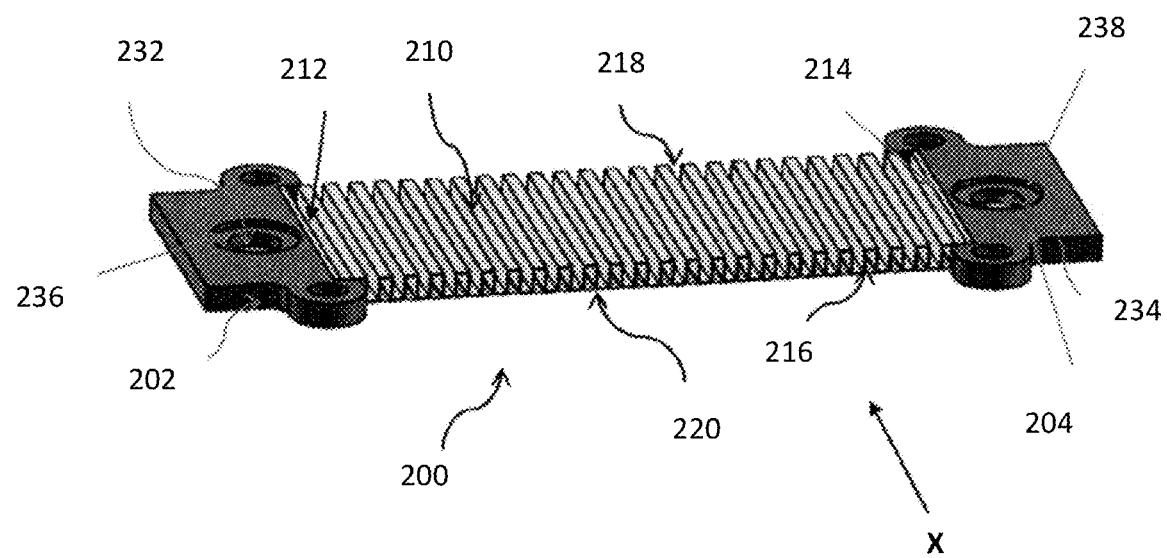
FIG. 2A is a front perspective view of a plate member with a separator sheet removably attached in another exemplary embodiment.
Figure 2B:
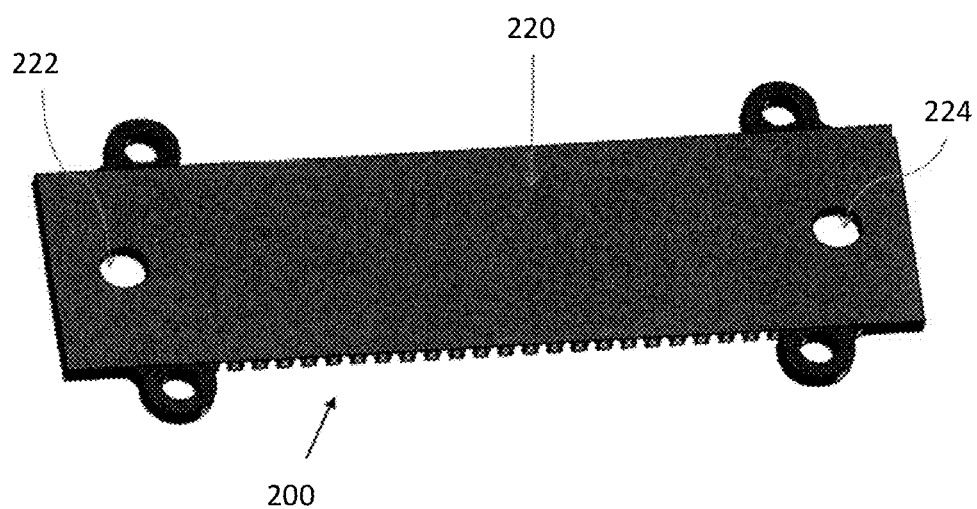
FIG. 2B is a bottom view of the plate member of FIG. 2A.
Figure 3:
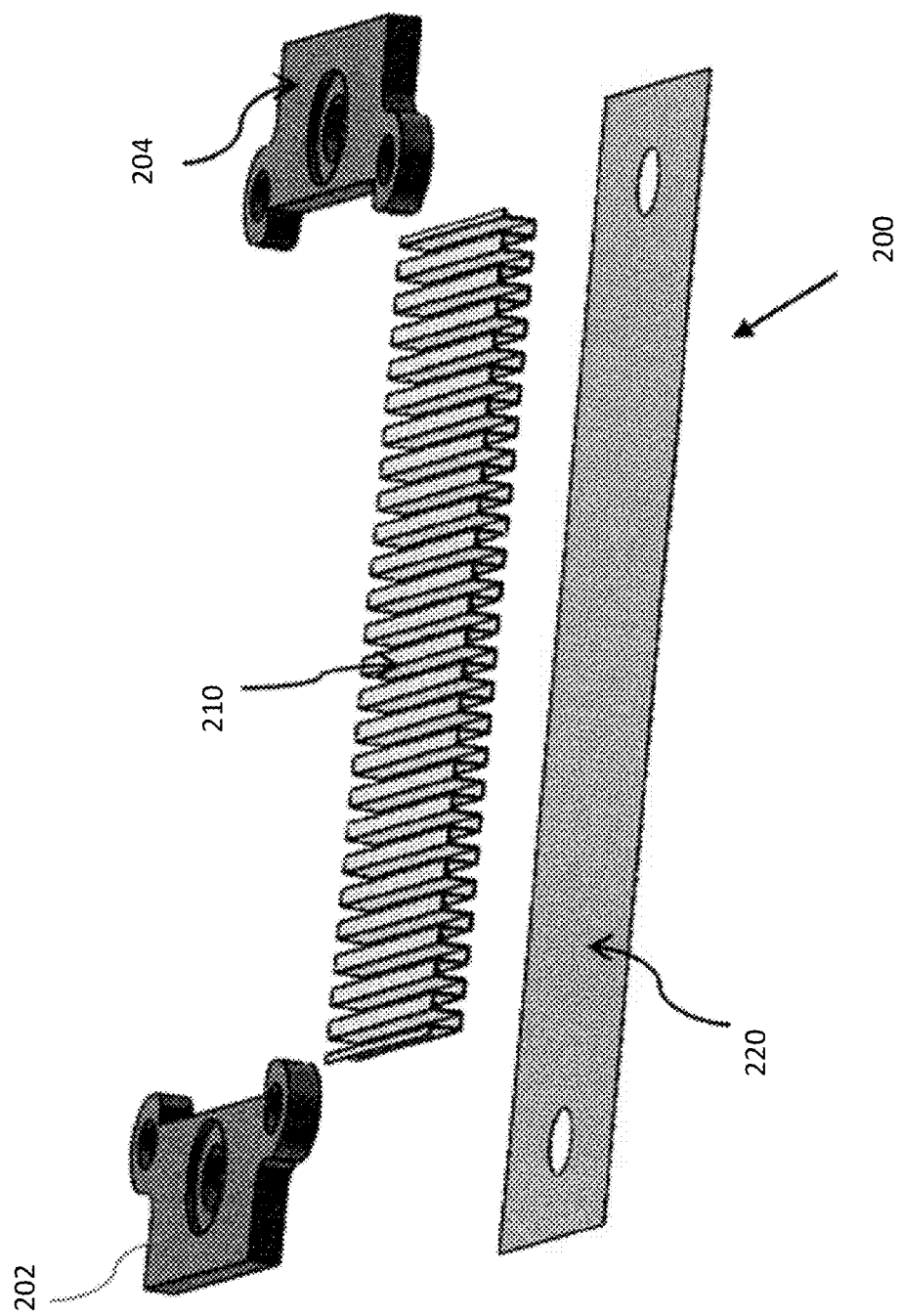
FIG. 3 is an exploded view of the plate member of FIGS. 2A and 2B.

FIG. 2A is a front perspective view of an embodiment of a plate member with a separator sheet removably attached in another exemplary embodiment. FIG. 2B is a bottom view of the plate member of FIG. 2A. FIG. 3 is an exploded view of the plate member 200 of FIGS. 2A and 2B. For the ease of illustration, like numerals from FIGS. 2A and 2B are used in FIG. 3.

In the exemplary embodiment, the plate member 200 is substantially similar to the plate member 100 of FIG. 1. The plate member 200 includes a first and a second alignment part 202, 204 respectively, a corrugated sheet 210 and a separator sheet 220.

In the exemplary embodiment, the first and second alignment parts 202, 204, the corrugated sheet 210 and the separator sheet 220 are removably attached to one another.

Each alignment part 202, 204 includes a through hole 232, 234 respectively. A groove or recess is provided around each through hole 232, 234 and are identified as respective sealing parts 236, 238. The separator sheet 220 includes a pair of apertures 222, 224 symmetrically located at opposite ends of the separator sheet 220. The corrugated sheet 210 is engaged/coupled to the first and second alignment parts 202, 204 at a first end or end edge 212 of the corrugated sheet 210 and at a second end or end edge 214 of the corrugated sheet 210 respectively. The plate member 200 is formed by orientating the separator sheet 220 with respect to the alignment parts 202, 204 such that the through holes 232, 234 of the alignment parts 202, 204 are aligned to the corresponding apertures 222, 224 of the separator sheet 220.

In the exemplary embodiment, each sealing part 236, 238 is used to contain a complementary sealing component. A complementary sealing component, for example, a gasket or an O ring, is disposed in each of the sealing parts 236, 238 (e.g., grooves or recesses) to provide airtight integration. Various sealing materials may be employed to form the sealing component. In one embodiment, the sealing material may include an elastomer, including natural or synthetic elastomers. For example, the sealing material may include rubber, fluoroelastomers (FKM), perfluoroelastomers (FFKM), silicone, Viton, EPDM, Nitrile and Neoprene. Other types of elastomers may also be useful.

After the first and second alignment parts 202, 204, the corrugated sheet 210 and the separator sheet 220 are coupled to one another, at the first alignment part 202, a through opening is formed by the aperture 222, the corresponding sealing component (e.g., gasket, O ring etc) and the through hole 232. At the second alignment part 204, another through opening is formed by the aperture 224, the corresponding sealing component and the through hole 234.

In one embodiment, the sealing components facilitate an airtight arrangement with the alignment parts and the separator sheet. A plate member assembly includes the plate member with alignment parts and a corrugated sheet, a membrane electrode assembly (MEA) and a separator sheet. The details of the MEA will be described later.

In general, an MEA includes opposing first and second surfaces. A first surface contacts the plate member, such as the alignment parts and corrugated sheet. The first surface of the MEA contacting the corrugated sheet is the cathode side of the MEA. The second surface of the MEA is the anode side. The separator sheet includes opposing first and second surfaces. The first surface of the separator sheet includes an anode flow field and the second surface of the separator sheet may include a smooth surface without the flow field within the surface. The first surface of the separator sheet is edged sealed to the second surface of the MEA.

Depending on the configuration, the first surface of the MEA may be the top surface or the bottom surface. For example, the top surface of the MEA may contact the bottom surface of the alignment parts and corrugated sheet and the first surface of the separator sheet is attached to the bottom surface of the MEA. Alternatively, the bottom surface of the MEA may contact the top surface of the alignment parts and corrugated sheet and the first or bottom surface of the separator sheet is attached to the top surface of the MEA. The second surface of the separator sheet, in one embodiment, forms an airtight arrangement with the alignment parts of an adjacent plate member assembly. For example, the smooth surface of a separator sheet contacts the surface of alignment parts with the sealing component of an adjacent plate member.

With the separator sheet 220 coupled in an airtight arrangement with the first and second alignment parts 202, 204, by co-operating with the corrugated sheet 210, fluid flow channels are formed. That is, a plurality of closed troughs e.g., 216 and open troughs e.g., 218 are formed and located in an interval manner. The closed troughs 216 are channels formed between the corrugated sheet 210 and the separator sheet 220, with openings at two ends (that is, closed through channels when viewed in the direction of X in FIG. 2A). The closed troughs 216 are capable of functioning as air flow channels for cooling the separator sheet 220, the corrugated sheet 210, and thus, an assembled cell stack after assembly. The open troughs 218 are open or not enclosed in the direction perpendicular to the plane of the corrugated sheet 210, or perpendicular to the plane or surface of the separator sheet 220. Therefore, the open troughs 218 are capable of dispersing air flowing through the open troughs 218 into the perpendicular direction. For example, air flowing through the open troughs 218 may be dispersed onto a diffusion medium on the cathode side of an MEA subsequently attached on the surface of the corrugated sheet 210 that exposes the open troughs 218.

Illustratively, a separator sheet is attached to a first or top surface of the alignment parts while an MEA is disposed on a second surface or bottom surface of the alignment parts. The separator sheet, for example, is a separator sheet of an adjacent plate member assembly. The separator sheet is disposed on the surface of the alignment parts with the sealing components. For example, the separator sheet of a first plate member assembly is disposed on the surface of alignment parts of a second plate member assembly with the sealing components. The sealing components facilitate airtight sealing between the separator sheet and the alignment parts.

Figure 4A:
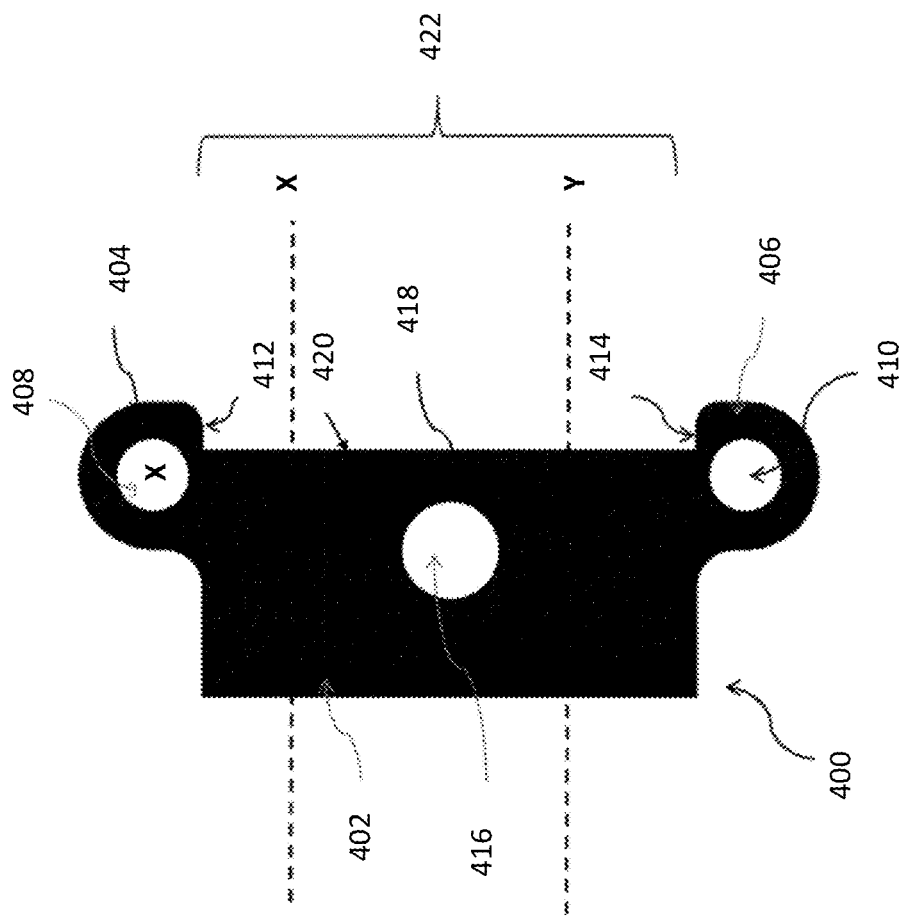
FIG. 4A is a top view of an alignment part in an exemplary embodiment.
Figure 4B:
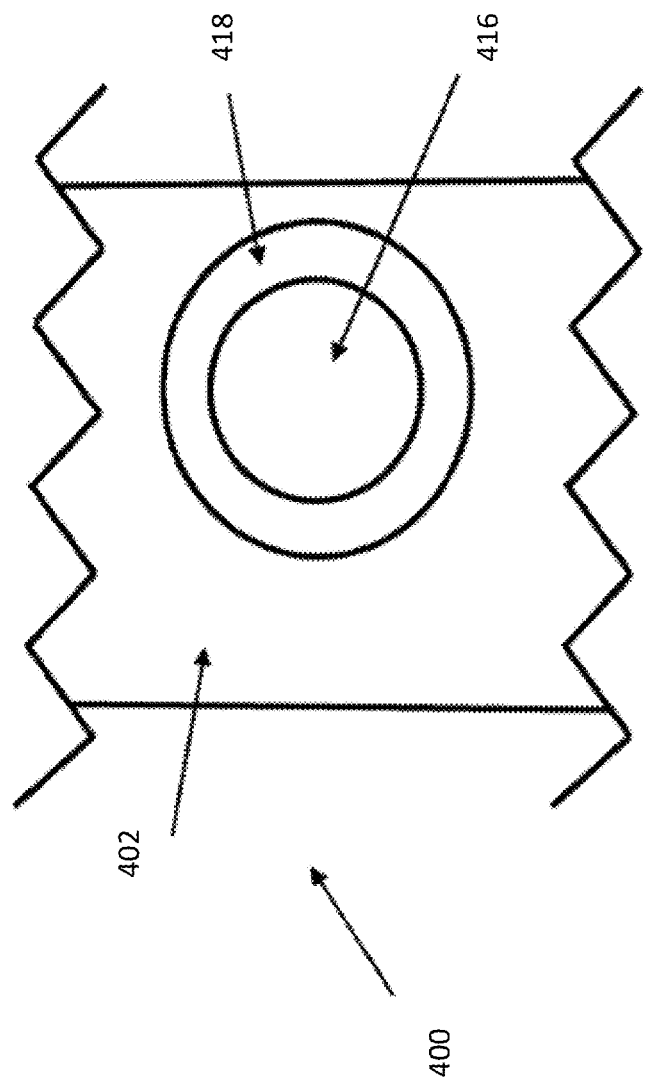
FIG. 4B is an enlarged view of the alignment part of FIG. 4A between the lines X and Y.

FIG. 4A is a top view of an alignment part in an exemplary embodiment. FIG. 4B is an enlarged view of the alignment part of FIG. 4A between the lines X and Y.

The alignment part 400 is substantially identical to the alignment parts 102, 104 of FIG. 1 and the alignment parts 202, 204 of FIGS. 2A to 3. In the exemplary embodiment, the alignment part 400 includes a main body 402, the main body 402 being a substantially rectangular sheet, and one or more alignment members, each alignment member disposed at one end of the main body 402. In the exemplary embodiment, there are provided two alignment members that are in the shapes of a substantially circular ring. The two alignment members are provided as two alignment rings 404, 406 symmetrically located at opposite sides or ends of the main body 402. Each alignment ring 404, 406 includes an alignment hole 408, 410 provided substantially in the centre of the ring 404, 406 and an alignment fringe 412, 414.

The alignment hole 408, 410 is able to align to another corresponding alignment member (not shown) along an axis passing through the alignment hole 408, 410. An example of the axis is shown passing through the alignment hole 408 into the plane of the paper ("x"). For example, the alignment hole may align with an alignment member of another alignment part (e.g., identical to alignment part 400) or an end plate stacked either on a top or a bottom surface of the alignment part 400.

In the exemplary embodiment, the alignment fringe 412, 414 is substantially straight and perpendicular to a longitudinal edge or end engagement edge 420 of the main body 402. Each alignment fringe 412, 414 extends or projects from the longitudinal edge 420 of the main body 402, and extends within the plane of the main body. With this arrangement, the alignment fringes 412, 414 form a receiving dock 422 that provides an engagement surface to engage a channel sheet.

The alignment part 400 further includes a through hole 416 provided within the main body 402. The through hole 416 is provided substantially in the centre of the main body 402. A sealing part 418 in the form of a groove or recess is provided around the through hole 416. The sealing part has a height P (not shown) and the non-sealing part has a height N (not shown). In one embodiment, the sum of P and N equals the thickness T (not shown) of an alignment part. It will be appreciated that another similar sealing part (not shown) may be provided around the through hole 416 on the opposite surface of the alignment part 400 or the flipside of the alignment part 400. In such an instance, therefore, respective sealing parts are provided on two opposing surfaces of the alignment part. In the case with sealing parts on opposing surfaces of an alignment part, the thickness T is equal to P1 (height of the first sealing part on the first surface of the alignment part), P2 (height of the second sealing part of the second surface of the alignment part) and N, which is between P1 and P2. The through hole 416 is capable of functioning as part of a reactant gas (for example, hydrogen) flow channel to be described in greater detail below with reference to FIG. 9G. The sealing part 418 is used to contain or receive a complementary sealing component, for example a gasket or an O ring, during assembly for the purpose of airtight sealing.

The alignment part 400 may be produced by methods including, but not limited to, molding, casting, 3-D printing etc. The alignment part 400 may be made from materials including, but not limited to, metal, plastic (e.g., acrylonitrile butadiene styrene (ABS), Polylactic acid (PLA)) or composites etc.

Figure 5:
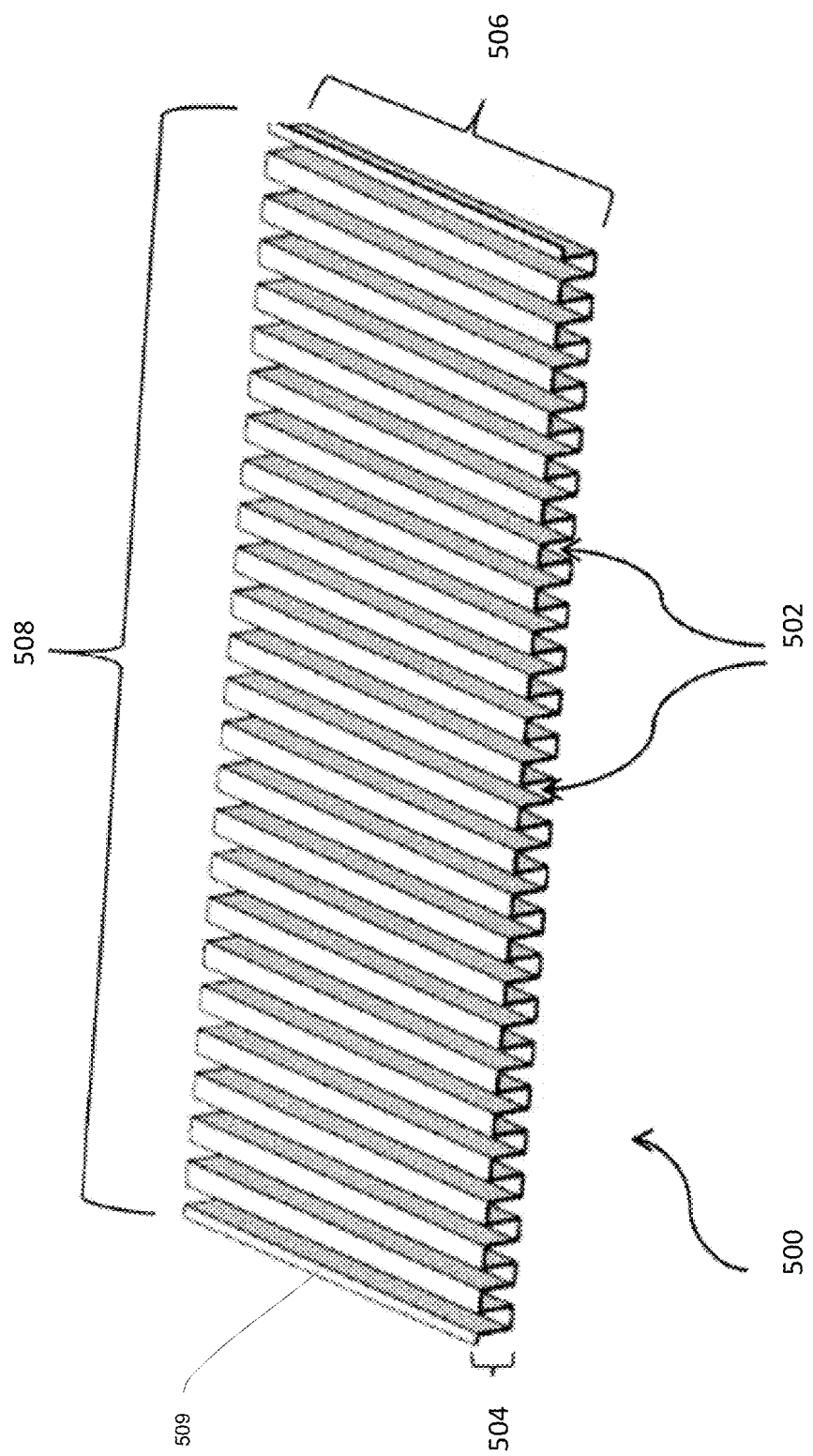
FIG. 5 is a front perspective view of a corrugated sheet in an exemplary embodiment.

FIG. 5 is a front perspective view of a corrugated sheet in an exemplary embodiment. The corrugated channel sheet 500 is identical or substantially identical to the channel sheet 110 of FIG. 1 and the corrugated sheet 210 of FIGS. 2A to 3.

In the exemplary embodiment, the corrugated channel sheet 500 is a rectangular shaped corrugated sheet having opposing end edges (first and second end edges) and opposing side edges (first and second side edges). The side edges may be in a first or lengthwise direction while the end edges may be in a second or crosswise direction. The first and second directions may be perpendicular to each other. The corrugated sheet includes a plurality of troughs 502 along the second direction between the end edges. The troughs with trough walls form openings up and down in an interval manner on or along the side edges. For example, a trough is formed between two peaks. The depth of each trough is substantially the same. The troughs serve as corrugated sheet flow channels.

In a preferred embodiment, an end edge of the channel sheet is flushed with a trough wall of the corrugated channel sheet. For example, the end edge (trough wall) of the channel sheet is flushed against the end engagement edge of an alignment part. This advantageously improves contact of the MEA to the alignment parts.

In other embodiments, an end edge includes a sheet engagement lip 509. For example, the first end of the sheet includes a first sheet engagement lip while the second end of the sheet includes a second sheet engagement lip. In one embodiment, the engagement lips of the channel sheet are configured to rest on top of the alignment parts. For example, the engagement lips rest on top of the end engagement edges of the alignment parts. Alternatively, the engagement lips may be configured to rest on the bottom of the alignment parts, such as the bottom end engagement edges of the alignment part. In another embodiment, one engagement lip is configured to rest on the top of the alignment part and the other engagement lip is configured to rest on the bottom of the alignment part. Preferably, the engagement lip should be as small as possible. Alternatively, the edge of the engagement lips may be configured to be flushed with a surface of the alignment parts, such as top surfaces or bottom surfaces.

The corrugated sheet 500 is formed by, but is not limited to, mechanically stamping or rolling from a metal foil. In the exemplary embodiment, the metal foil is of a thickness of, but is not limited to, about 0.05 mm to about 0.4 mm. The material of the foil may be, but is not limited to, stainless steel, aluminium, titanium or other alloys. The corrugated sheet 500 may be coated with a corrosion-resistant layer, for example comprising, but is not limited to, a thin layer of gold, silver, carbon, metallic nitride, carbide or electrically conductive polymers.

In an exemplary embodiment, the height of the corrugated sheet 500 is slightly larger than the thickness of an alignment part (alignment part thickness) e.g., 102, 104, 202, 204, 400 as described above. In one embodiment, the thickness of the alignment part is slightly lesser than the height of the corrugated sheet, such as 5 to 20% lesser. For example, the thickness of the alignment part may be about 1.0 mm while the height of the corrugated sheet may be about 1.1 mm. In such cases, the corrugated sheet is about 10% larger than the thickness of the alignment part. By having the thickness of the alignment part slightly lesser than the height of the corrugated sheet (or height of the corrugated sheet slightly larger than the thickness of the alignment part), good contact between an MEA and a corrugated sheet of each cell of the cell stack is ensured after assembly to avoid high internal resistance.

In one exemplary embodiment for use in a portable fuel cell application, the sheet thickness used to form the corrugated sheet 500 is about 0.05 mm. In such an embodiment, the height 504 (corrugated sheet height) is about 1.1 mm. The width 506 (crosswise direction) is about 80.0 mm, and the length 508 (lengthwise direction) is about 150.0 mm. It will be appreciated that the dimensions described here are provided for exemplary purposes and may be varied substantially, depending on the application(s).

Figure 6:
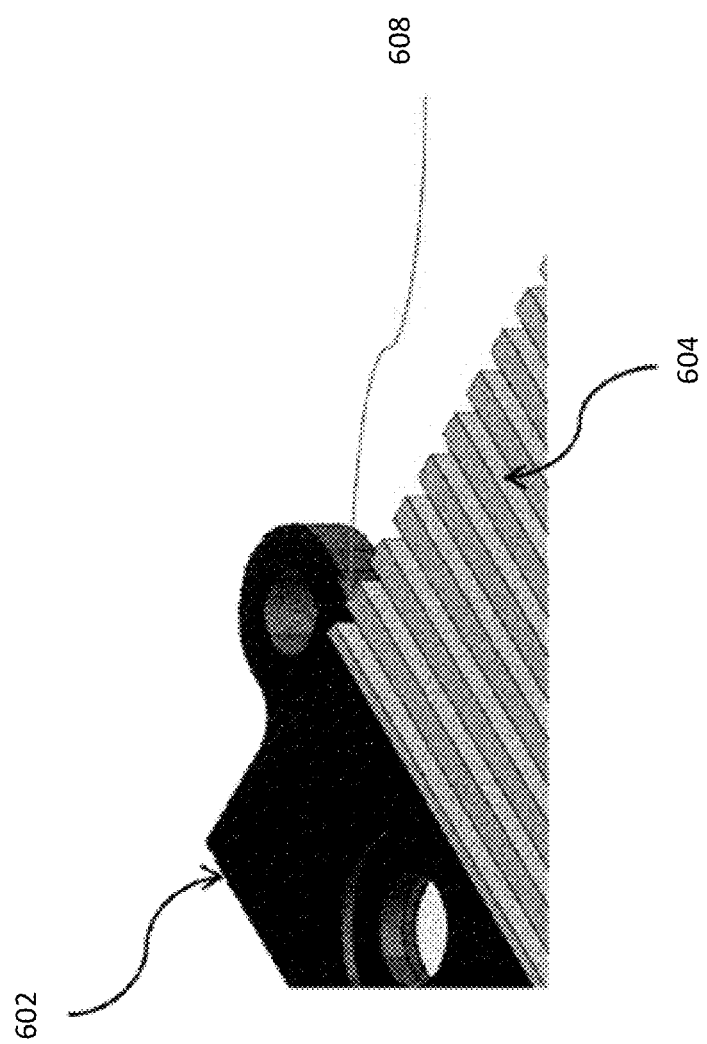
FIG. 6 is a partial enlarged drawing of a coupling between a corrugated sheet and an alignment part in an exemplary embodiment.

FIG. 6 is a partial enlarged drawing of a coupling between a corrugated sheet and an alignment part in an exemplary embodiment. The alignment part 602 is identical or substantially identical to the alignment part 400 of FIG. 4A and the corrugated sheet 604 is substantially identical to the corrugated sheet 500 of FIG. 5. For example, an alignment part 602 includes a main body with alignment fringes or extensions 608.

Each end of the corrugated sheet 604 is attached to or abuts respectively an inner longitudinal edge of two alignment parts (compare the longitudinal edge 420 of the main body 402 of FIG. 4A). The longitudinal edge functions as the engagement surface to engage the corrugated sheet 604. In the exemplary embodiment, the corrugated sheet 604 is inserted between two alignment extensions or fringes of the alignment part 602. For illustration, only one alignment fringe 608 is shown in FIG. 6. The alignment fringes form a receiving dock (compare the receiving dock 422 of FIG. 4A). The distance provided between the pair of alignment fringes 608 of the alignment part 602 allows the corrugated sheet 604 to be held tightly between the pair of alignment fringes 608. In addition, the corrugated sheet 604 may also have a hook-type arrangement by additionally contacting the top surface of the alignment part at the longitudinal edge. Consequently, the corrugated sheet 604 is held tightly between the pair of alignment parts to ensure that the corrugated sheet 604 is in the right location within a stack assembly. The height of the corrugated sheet 604 is slightly larger than the thickness of the alignment part 602 to ensure good contact with the MEA.

The corrugated sheet 604, in one embodiment, is configured to be flushed or level with one of the top or bottom surface of the alignment parts after assembly of the fuel cell due to compression force. For example, the peaks (top surface) or troughs (bottom surface) of the corrugated sheet is coplanar with the top or bottom surface of the alignment part. The MEA is a compressible component while the corrugated sheet, separator sheet and alignment parts are not compressible components. The coplanarity of the corrugated sheet with a surface of the alignment, for example, may have variances due to manufacturing/fabrication tolerances or process. This may result in the corrugated sheet to not be exactly flushed or level with a surface of the alignment parts.

A plate member assembly may be provided in which a separator sheet is disposed on the top surface of the alignment parts. The separator sheet, for example, is attached to a bottom surface of an MEA. The separator sheet and MEA, for example, are part of an adjacent plate member assembly of a cell stack. The MEA of the plate member assembly is provided on the bottom surface of the alignment parts. A separator sheet of the plate member assembly is attached to a bottom surface of the MEA.

As an example, a fuel cell may include first and second plate member assemblies. The first plate member assembly includes: a) first alignment parts at end edges of a first corrugated sheet, the first alignment parts include first and second alignment part surfaces; b) a first MEA with first and second MEA surfaces in which the first MEA surface is attached to a second surface of the first alignments parts; and c) a first separator sheet having a first separator sheet surface attached to a second MEA surface of the first MEA. The second plate member assembly includes: a) second alignment parts at end edges of a second corrugated sheet, the second alignment parts include first and second alignment part surfaces; b) a second MEA with first and second MEA surfaces in which the first MEA surface is attached to a second surface of the second alignments parts; and c) a second separator sheet having a first separator sheet surface attached to a second MEA surface of the second MEA. When stacked for assembling the fuel cell, for example, the second surface of the second separator sheet of the second plate assembly may be disposed on the first surface of the first alignment parts of the first plate assembly member.

Prior to assembly without any compressive force applied, the bottom of the corrugated sheet sits on the MEA and is flushed with the bottom surface of the alignment parts. However, the top of the corrugated sheet is slightly higher than the top surface of the alignment parts. For example, the top of the corrugated sheet may be higher by 5-20% of the thickness of the alignment parts. As such, the peaks of the corrugated channel sheet is disposed slightly above the top of the alignment parts.

When a compressive force is applied to the cell assembly, such as about 5-20 kg/cm$^2$ (~0.5-2 MPa), the corrugated sheet is pushed downwards by the separator sheet since it is not compressible. This results in the peaks or top of the corrugated sheet to be flushed or level with the top surface of the alignment parts. Also, the corrugated sheet is pushed into the MEA, compressing the MEA. For example, the troughs of the corrugated channel sheet are pushed into the MEA. Since only the MEA is considered compressible, the height of the corrugated sheet can be selected to avoid compressing the MEA beyond its limits, and therefore avoiding damaging it during assembly.

Figure 7:
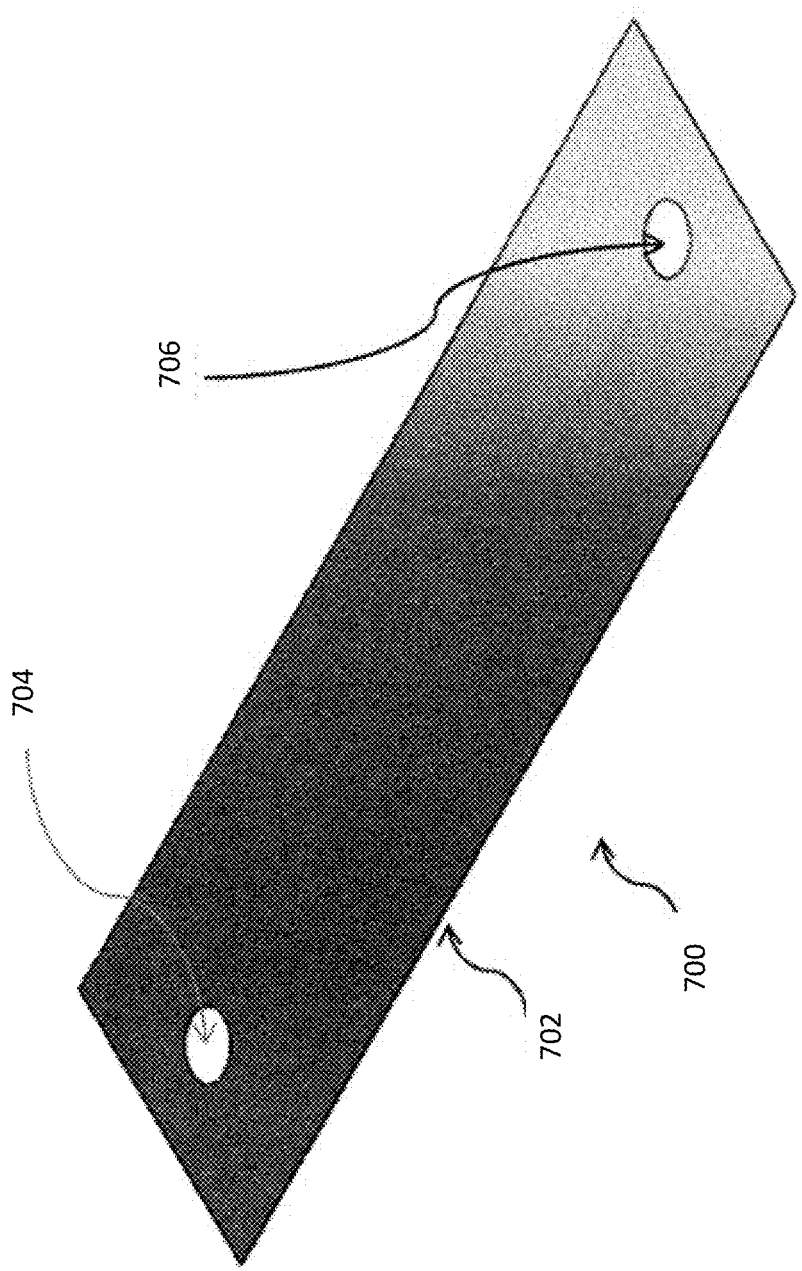
FIG. 7 is a top perspective view of a separator sheet in an exemplary embodiment.

FIG. 7 is a top perspective view of a separator sheet in an exemplary embodiment. The separator sheet 700 is substantially identical to the separator sheet 220 of FIGS. 2A, 2B and 3.

In the exemplary embodiment, the separator sheet 700 includes a substantially rectangular sheet body 702. A pair of apertures 704, 706 are provided symmetrically located near the opposite ends of the sheet body 702. The positions of the apertures 704, 706 are predetermined such that the apertures 704, 706 correspond to through holes provided at two alignment parts. In the exemplary embodiment, the separator sheet 700 is made of, but is not limited to, an electrically conductive metal foil with a thickness of, but is not limited to, about 0.05 mm to 0.2 mm. Alternatively, the separator sheet 700 may be made of, but is not limited to, a graphite foil or similar material with a thickness of about 0.3 mm to 1 mm.

Figure 10:
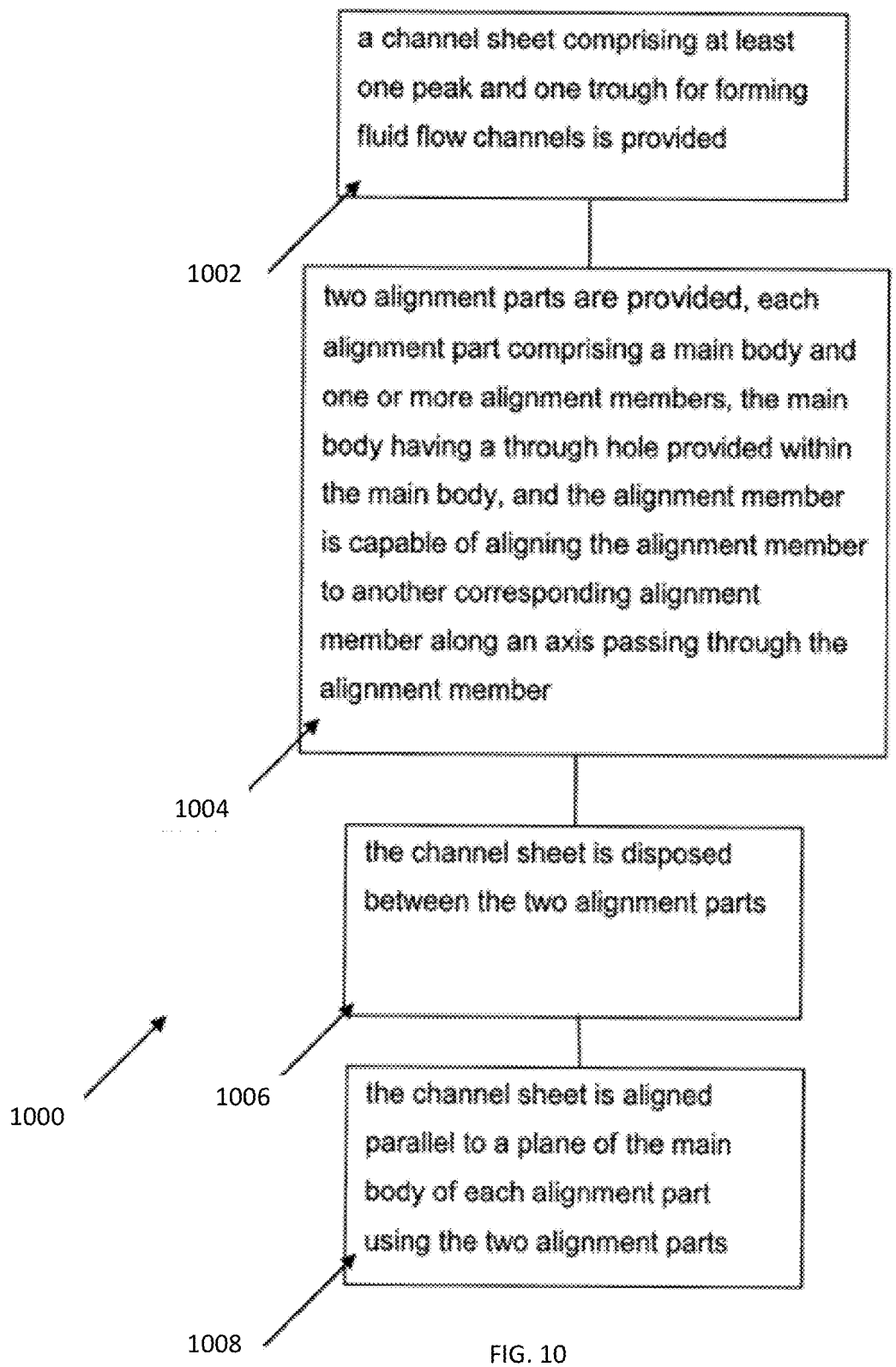
FIG. 10 is a schematic flowchart for illustrating a method of forming a plate member for a cell stack in an exemplary embodiment.

FIG. 10 is a schematic flowchart for illustrating a method of forming a plate member for a cell stack in an exemplary embodiment. At step 1002, a channel sheet comprising at least one peak and one trough for forming fluid flow channels is provided. At step 1004, two alignment parts are provided, each alignment part comprising a main body and one or more alignment members, the main body having a through hole provided within the main body, and the alignment member is capable of aligning the alignment member to another corresponding alignment member along an axis passing through the alignment member. At step 1006, the channel sheet is disposed between the two alignment parts. At step 1008, the channel sheet is aligned parallel to a plane of the main body of each alignment part using the two alignment parts.

In the description below, formation of a cell stack is described. A plate member substantially similar to the plate member 200 of FIGS. 2A, 2B and 3 is used as a bipolar plate of the cell stack.

Figure 8A:
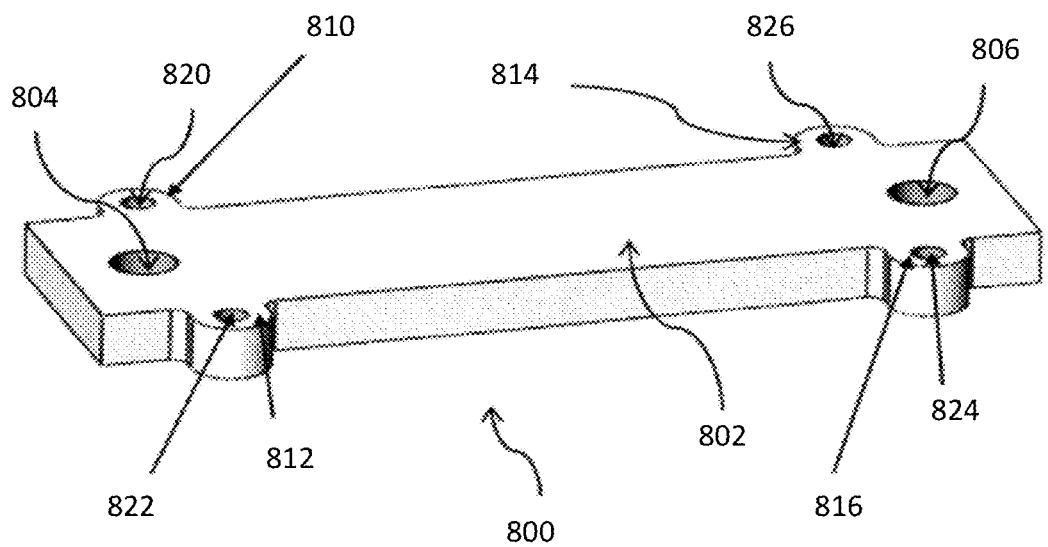
FIG. 8A is a front perspective view of an end plate.

FIG. 8A is a front perspective view of an end plate. The end plate 800 includes a substantially rectangular main body 802, a pair of ducting holes 804, 806, two pairs of assembly rings 810, 812, 814, 816, and two pairs of corresponding assembly holes 820, 822, 824, 826. The end plate 800 functions as a base for a cell stack. The end plate 800 is used for, but is not limited to, holding a stack of plate members securely, for forming the shape of the stack, for fixing accessory parts etc. The ducting holes 804, 806 form part of the fuel gas (e.g., hydrogen) flow channels (fuel manifolds). The material of the end plate 800 may be, but is not limited to, metal, plastic, and composites.

Figure 8B:
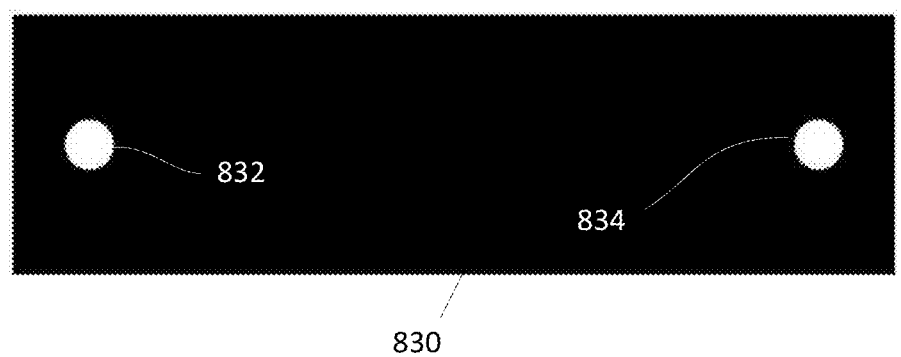
FIG. 8B is a front view of a Membrane Electrode Assembly (MEA).

FIG. 8B shows an embodiment of a front view of an embodiment of a Membrane Electrode Assembly (MEA). The MEA 830 is a substantially rectangular body with two through apertures 832, 834 in opposite ends of the rectangular body. Other shaped bodies for the MEA may also be useful. The MEA may be a commercially available MEA and in such cases, the detailed structure of the MEA 830 may be obtained from the manufacturer, such as Gore, Ballard, Johnson Matthey, and Yangtze. Typically, there is one layer of Proton Exchange Membrane (PEM) sandwiched between two layers of dispersion mediums. One catalyst layer is located in each of the interfaces between the PEM and the dispersion mediums. Thus, there are five layers of material in a typical MEA. Typically, according to the catalyst used, one side of the MEA is the cathode side where air can be introduced for reaction, and the other side is the anode side for input of hydrogen fuel.

Figure 8C:
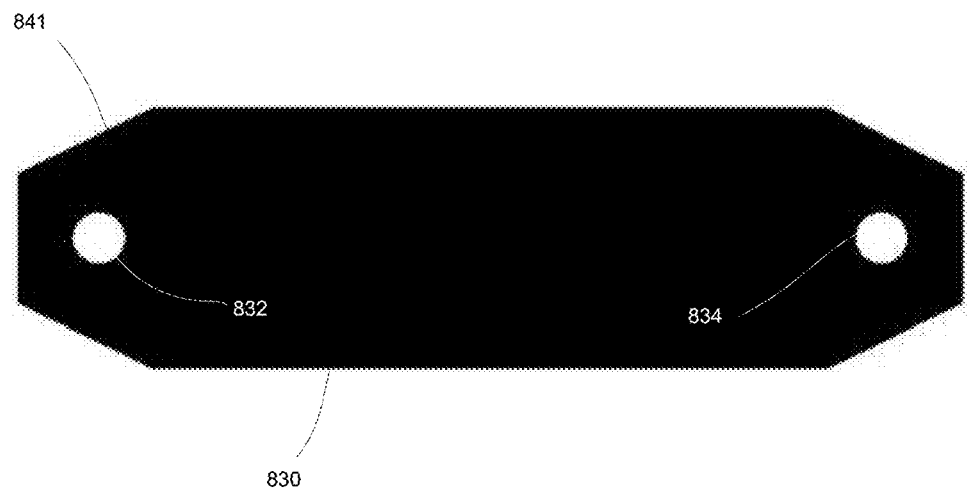
FIG. 8C is a front view of another Membrane Electrode Assembly (MEA).

FIG. 8C shows a front view of another embodiment of an MEA 830. As shown, the MEA has an octangular shaped body with two through apertures 832, 834 in opposite ends of the body. The end portions of the body include slanted edges 841, creating the octangular shaped body. Providing a body with other shaped bodies may also be useful.

Figure 8D:
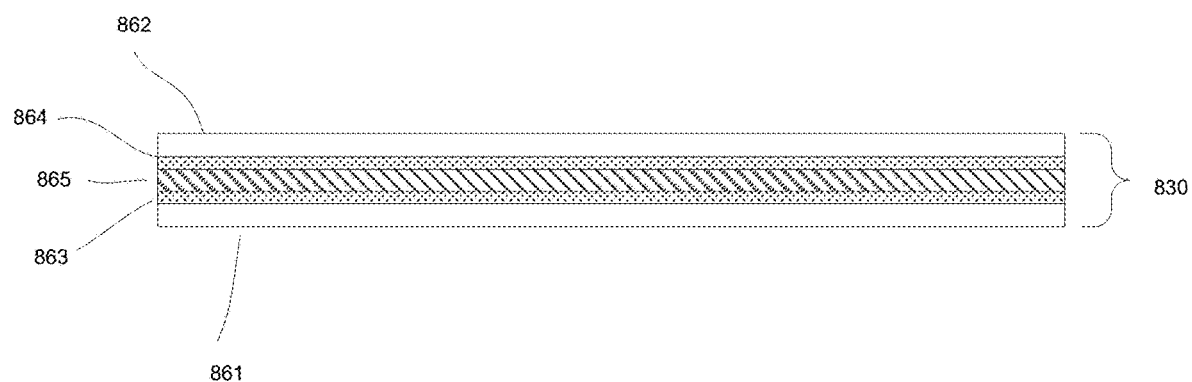
FIG. 8D is a cross-sectional view of a Membrane Electrode Assembly (MEA).

FIG. 8D shows a cross-sectional view of an embodiment of a membrane electrode assembly (MEA) 830. In one embodiment, the MEA includes a PEM layer 865, which is sandwiched between a first dispersion layer 861 and a second dispersion layer 862. In the interface between the PEM layer 865 and the first dispersion layer 861, there is a very thin first catalyst layer 863, while in the interface between the PEM layer 865 and the second dispersion layer 862, there is a very thin second catalyst layer 864.

A dispersion layer or medium, for example, is a gas diffusion layer (GDL). One dispersion medium with catalyst layer serves as a cathode while the other serves as an anode. In one embodiment, the dispersion medium which contacts the separator sheet is the anode side and the dispersion medium which contacts the channel sheet is the cathode side. The separator sheet or layer, for example, is an electrically conductive separator sheet. The separator sheet may be formed of conductive materials, such as stainless steel, titanium, aluminum, or alloys. The conductive material may be coated with a corrosion-resistant layer, such as a thin layer of gold, silver, carbon, metallic nitride or carbide, or electrically conductive polymers, such as metal foils or graphite foils. Other types of conductive materials and coatings may also be useful. The separator sheet is configured with flow fields, such as parallel, serpentine, interdigital or porous flow fields. Other types of flow fields may also be useful. Furthermore, other configurations of MEAs may also be useful. For example, the MEA may include other layers or configuration of layers.

In one embodiment, the dispersion layers of the MEA are compressible while other layers are not compressible. In a stack, the MEAs are compressed in order to ensure intimate contact to bipolar plates and thus decreasing the internal specific resistance. The compressibility is governed by the dispersion layers of the MEAs. Hence the behaviour of the dispersion layers is crucial for stack sealing and performance. The manufacturers/suppliers, such as Ballard, SGL, or Toray, may provide compression curves and information on the effects of compression on the gas permeability and specific resistance of the MEA. Such information facilitates the users to optimize their stack assembling and sealing process through a holistic analysis of MEA/cell/stack performance. The maximum compression rate as well as the recommended compression rate for the dispersion layers of the MEA can be thus determined. The compression rate (CR) is defined by the nominal thickness (before compression) minus the compressed thickness (final thickness). For example, in the case of a dispersion layer having a nominal thickness of 315 μm and a suggested or recommended compression thickness of 230 μm, the recommended compression rate ($CR_{rec}$) would be 85 μm. $CR_{rec}$, for example, is the compression at which the MEA operates optimally. During stack assembly, there is a tolerance of around +/−5-10% for the recommended compression rate, beyond which may cause damage to the delicate MEA or high internal resistance and thus poor performance.

FIGS. 9A to 9G are schematic drawings for illustrating the steps of assembling a fuel cell stack assembly in an exemplary embodiment.

In FIG. 9A, a rod 930, 932, 934, 936 is installed/inserted into each assembly hole 920, 922, 924, 926 of a first end plate 900. The end plate 900 is substantially identical to the end plate 800 of FIG. 8A.

In FIG. 9B, a plate member 940 (e.g., 200 of FIGS. 2A and 2B) is assembled. The rods 930, 932, 934, 936 pass through alignment holes 942, 944, 946, 948 of the plate member 940. The separator sheet (not shown) of the plate member 940 rests on the first end plate 900. A plurality of open troughs (e.g., 218 of FIG. 2A) face upwards with respect to the end plate 900. In FIG. 9C, a layer of MEA 950 is located/placed on the top of the plate member 940, with the cathode side of the MEA 950 facing downwards, towards the open troughs. The MEA 950 thus abuts a top surface of the alignment part of the plate member 940. The MEA 950 may be substantially identical to the MEA 830 of FIG. 8B or 8C. Each of the through apertures 952, 954 of the MEA 950 is aligned with a respective through opening formed by the apertures (e.g., 704, 706 of FIG. 7) of the separator sheet, the sealing components (e.g., gasket, O ring etc) of the plate member 940 and the through holes 943, 945 of the alignment parts of the plate member 940.

The MEA 950 and the plate member 940 form a single cell. More single cells are formed by repeating the above steps, until a pre-determined capacity or number of single cells is reached, as shown in FIGS. 9D and 9E.

In FIG. 9F, after a pre-determined capacity is reached, a second end plate 960 is located/placed. Each assembly hole 962, 964, 966, 968 of the second end plate 960 is installed/inserted with the respective rods 930, 932, 934, 936. Therefore, the cells are disposed between two end plates 900, 960.

In FIG. 9G, assembly of the fuel cell stack is completed by tightening nuts e.g., 970 on the rods 930, 932, 934, 936 and installing gas connectors (not shown) into the ducting holes 904, 906 of the first end plate 900.

After the other accessories, such as, current collectors, wires, fans etc. are installed, the assembled cell stack 972 is capable of being used as a power generator.

With the assembly of the cell stack 972, the respective aperture (e.g., 704, 706 of FIG. 7) of the separator sheet, the through hole 943 of the member plate, the through aperture 952 of the MEA and the ducting hole 904 are aligned and form a first fluid flow channel in one end of the stack. Similarly, at the other end of the stack, the other respective aperture of the separator sheet, the through hole 945 of the member plate, the through aperture 954 of the MEA and the ducting hole 906 are also aligned and form a second fluid flow channel.

In the exemplary embodiment, the cell stack 972 forms an open cathode assembly with the un-enclosed through channels of each corrugated sheet (compare channels viewed from arrow X of FIG. 2A). The troughs of each corrugated sheet form airflow channels for such an assembly.

In use, fuel (e.g., hydrogen gas) supplied from the gas connectors is delivered into the assembled cell stack 972 through the fluid flow channels. The fuel thus flows into the dispersion mediums (through the anode flow field) in the anode sides of the MEAs e.g., 950. For the oxidant (oxygen) supply, air is inducted to the dispersion mediums in the cathode sides of the MEAs e.g., 950 through the plurality of open troughs (e.g., 218 of FIG. 2A). Electricity is thus generated from electrochemical reactions between the hydrogen and oxygen inside the MEAs e.g., 950.

During stack assembly, compressive force is exerted onto the corrugated sheet. The amount of compressive force selected should be an optimal amount of compressive force. For example, during conventional stack assembly, an excessive compressive force may result in structural damage to the corrugated sheet while insufficient compressive force results in high inner resistance and poor electrochemical performance for the cell stack. Furthermore, MEAs of the cell stack are typically fragile. Excessive compressive force used during the assembly process, may crush or partially damage the dispersion mediums in the MEAs. This, in turn, affects the diffusion of the reactant gases (hydrogen and oxygen) into the catalyst layer in MEAs and may compromise or even damage the fuel cell.

The plate member of the described exemplary embodiments may avoid the above problems. The alignment parts of the plate member assembly are able to withstand compressive force, thereby protecting the corrugated sheet and the dispersion mediums in the MEAs from damage, as well as maintaining low resistance. As a result, the assembled fuel cell is reliable and performs optimally.

Figure 11A:
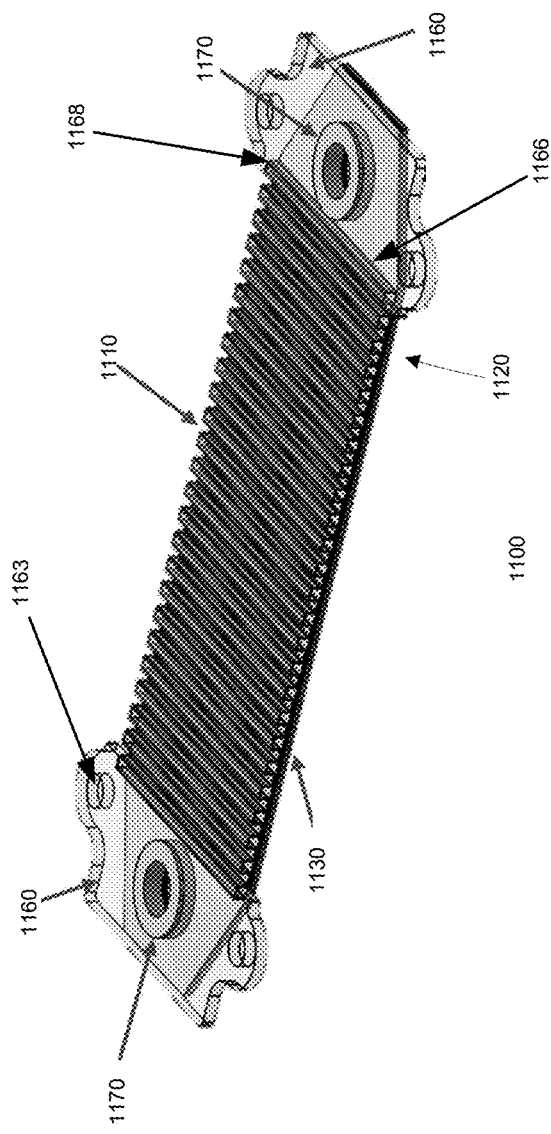
FIGS. 11A to 11B are perspective and cross-sectional views of an embodiment of a plate member assembly.
Figure 11B:
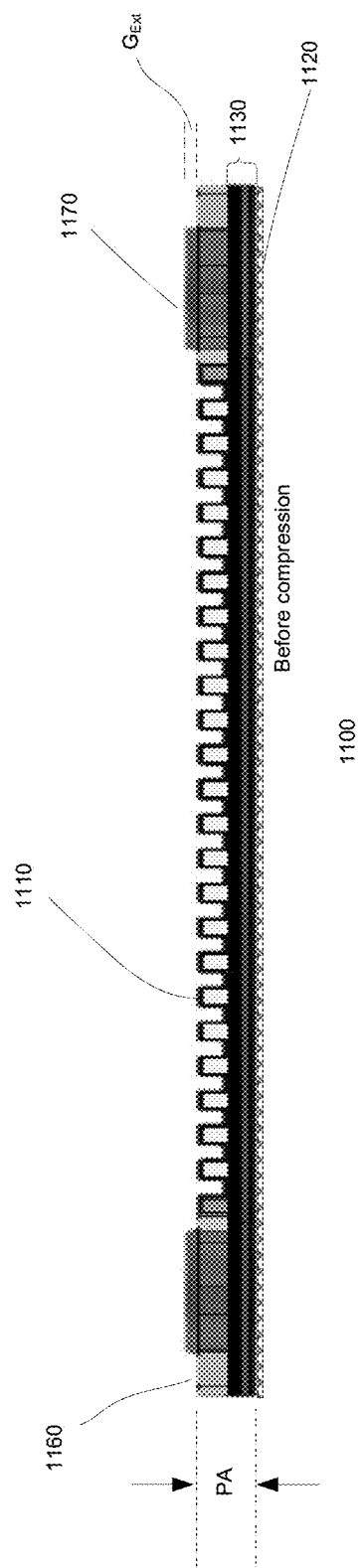

FIGS. 11A-11B show perspective and cross-sectional views of an embodiment of a plate member assembly 1100. The plate member assembly includes similar or common elements as those already described. Common elements may not be described or described in detail. As shown, the plate member assembly includes a corrugated channel sheet 1110 disposed between first and second alignment parts 1160. For example, the first alignment part is disposed at a first end edge of the corrugated channel sheet and the second alignment part is disposed at a second end edge of the corrugated channel sheet. The corrugated channel sheet and alignment parts form, for example, a plate member.

An alignment part includes a main body with a through hole. The through hole, for example, serves as a flow channel. The main body also includes a sealing part or receptacle. The sealing part is configured to retain a sealing component 1170, such as a gasket or an O ring. For example, the sealing part may be a groove or recess surrounding the through hole. The sealing component is configured to fit into the sealing part. As shown, the sealing part is configured so that the sealing component fits into the sealing part from the top surface of the alignment part. Alternatively, the sealing part can be configured so that the sealing component fits into the sealing part from the bottom surface of the alignment part.

The sealing component may be, for example, a gasket or an O ring. As shown, the sealing component is disposed within the sealing part to provide airtight integration. Various sealing materials may be employed to form the sealing component. In one embodiment, the sealing material may include an elastomer, including natural or synthetic elastomers. For example, the sealing material may include rubber, fluoroelastomers (FKM), perfluoroelastomers (FFKM), silicone, Viton, EPDM, Nitrile and Neoprene. Other types of elastomers or sealing materials may also be useful.

When a sealing component is disposed within the sealing part, it extends above (or below) the surface of the alignment part. For example, the sealing component has a thickness which is selected so that it extends above (or below) the surface of the alignment part by $G_{ext}$ when fitted into the sealing part. For example, the total thickness G of the sealing component is equal to $G_{ext}+P$, the height of the sealing part. During assembly, compressive force is applied to compress the sealing component to be coplanar with a surface of the alignment parts. For example, the compressed height $G_{com}$ of the sealing component is P. In one embodiment, G is selected so that when the sealing component is compressed from the assembling of the fuel cell stack, it provides an airtight seal without extending excessively into the through hole to hinder or block flow to negatively impact performance according to design requirements or specifications.

The thickness G, for example, may depend on the material used. For example, when the sealing component is compressed so that its top surface is coplanar with the surface of the alignment part, it forms an airtight seal with a separator sheet above without hindering or blocking flow. Typically, the sealing component may be compressed by about 10-35%, depending on the material used. For example, depending on the material used, $G_{ext}$ is about 10-35% of the thickness G. During assembly, the sealing component is compressed to the surface of the alignment part.

Extensions are provided on opposing sides of the main body to form alignment fringes. For example, extensions extend beyond opposing sides of the corrugated channel sheet. The main body forms an end engagement edge 1166 for an end of the corrugated channel sheet while an extension forms a side engagement edge 1168 for a side edge at an end portion of the corrugated channel sheet. The side and end engagement edges enable the end portion of the corrugated channel sheet to fit tightly to the alignment part. This facilitates the alignment of the corrugated channel sheet to the alignment part.

In one embodiment, the alignment part is an integrated or a single part. For example, the various components of the alignment part, such as the main body with the through hole and sealing part and extensions, are formed as a single piece part. In one embodiment, the alignment part is formed of a rigid material which is resistant to compression force, such as a rigid plastic. The plastic alignment part may be molded into shape. Other types of rigid materials as well as other forming techniques may also be useful.

An extension of a main body includes an alignment hole 1163. In one embodiment, the through hole is configured between two alignment holes of the extensions. Alignment posts are used to align plate assemblies together to form a fuel cell stack assembly. The alignment parts provide horizontal alignment of a plate member assembly as well as vertical alignment with plate assemblies of the cell stack assembly using alignment posts.

In one embodiment, an MEA 1130 is attached to a surface of the alignment parts 1160. As shown, the MEA is provided on a bottom surface of the alignment parts, with the corrugated channel sheet sitting on it. The MEA, for example, includes a PEM layer with a catalyst layer and dispersion medium on opposing major surfaces thereof. The surface of the MEA contacting the corrugated sheet is the cathode side and the opposite side is the anode side. In one embodiment, the MEA is attached to the surface of the alignment parts opposite the surface fitted with the sealing component.

A separator sheet 1120 is removably attached to the plate member. In one embodiment, the separator sheet is attached to the anode side of the MEA. The separator sheet includes an anode flow field (for example, parallel, serpentine, interdigital, porous types of flow field) and apertures aligned with the through holes of alignment parts of the plate member. In one embodiment, the separator sheet may be edge-sealed with the MEA to form the anode gas chamber.

The thickness T of the alignment parts, in one embodiment, is configured to be slightly lesser than the height H of the corrugated channel sheet. For example, the thickness of the alignment parts may be about 5-20% lesser than the height of the corrugated channel sheet. The height H of the corrugated channel sheet, the thickness S of separator sheet and the thickness M of the MEA defines a total thickness PA of the plate member assembly. The thickness PA, for example, is the thickness of the plate member assembly without any compression force applied (uncompressed value). For example, PA=H+S+M. In one embodiment, PA does not take the height of the sealing part above the surface of the alignment parts. In the uncompressed state, T does not factor into PA since H is slightly greater than T.

Under compressive force, the MEA is compressed. The compression, for example, is due to the corrugated sheet being pushed into the MEA. In some cases, compression of the MEA may include portion of the MEA under the alignment parts. In one embodiment the MEA is compressed to a nominal compressed thickness $M_{nom}$ to achieve good or optimal performance. In one embodiment, $M_{nom}$ may be defined by the MEA manufacturer. The value of $M_{nom}$ may be a specific value or a range of values. In the case where $M_{nom}$ is a range, it may be from $M_{min}$ and $M_{max}$. Any values beyond the range, the MEA may not have good performance or function at all. For example, if excessive force causes the compressed thickness to be below $M_{min}$ or if not enough force causes the compressed thickness to be above $M_{max}$, bad or unreliable MEA performance may result.

The MEA is a compressive component of the plate member assembly while other components, such as the alignment parts, the corrugated channel sheet and the separator sheet are not. As such, the tightening thickness of the plate member assembly can be confined to the change of thickness of the MEA denoted as $\Delta M$. In one embodiment, $\Delta M$ is equal to $M-M_{nom}$. $M_{nom}$ may be a specific value of a range, such as from $M_{min}$ to $M_{max}$. The range $M_{min}$ to $M_{max}$ may be equal to range from $M-CR_{rec}+/-$ the tolerance (tolerance may be about 5-10%). For example, $M_{nom}$ may be equal to $M-CR_{rec}$ or $M-CR_{rec}+/-$ the tolerance.

Also, when compressed, the corrugated sheet is pressed into the MEA. The amount of the corrugated sheet being pressed into the MEA is equal to H–T. The amount of compression is, for example, $\Delta M$. $\Delta M$ is equal to H–T which is equal to $M-M_{nom}$. Accordingly, the compressed thickness $PA_{com}$ of the plate member assembly can be defined as:

$$PA_{com} = PA - \Delta M$$
$$= H + M + S - (H - T)$$
$$= T + M + S$$

For example, the assembly process of a fuel cell includes determining the overall thickness PA of the uncompressed plate member assembly. In one embodiment, PA=H+M+S. After determining PA, $\Delta M$ is determined. For example, $\Delta M = M - M_{nom}$, which may be equal to H–T. The plate member assembly is then compressed by tightening the end plates to reduce the thickness of PA by $\Delta M$ to $PA_{com}$. Once $PA_{com}$ is reached, tightening stops.

In the case when the fuel cell includes a plurality of plate member assemblies for a stacked fuel cell, the plate member assemblies are disposed between the end plates and tightened to a final assembly thickness $PA_{Acom}$, which can be defined as followed:

$$PA_{Acom} = PA_{com} \times N, \text{ where } N \text{ is equal to the number of plate member assemblies.}$$

Once $PA_{Acom}$ is reached, tightening stops. The compressive pressure, for example, is applied equally to all the MEAs of the plate member assemblies. As such, this is equal to the average thickness reduction over N plate member assemblies.

Figure 12A:
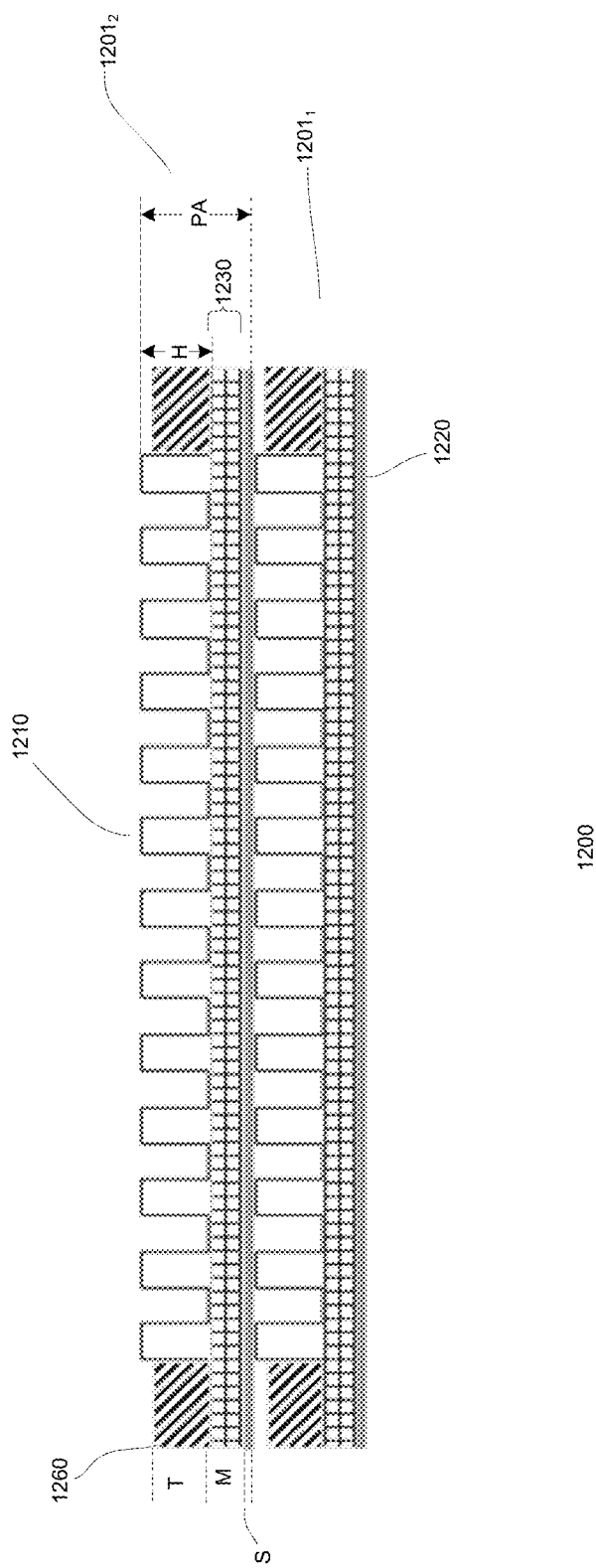
FIGS. 12A-12B are cross-sectional views of adjacent plate member assemblies in a fuel cell stack assembly.
Figure 12B:
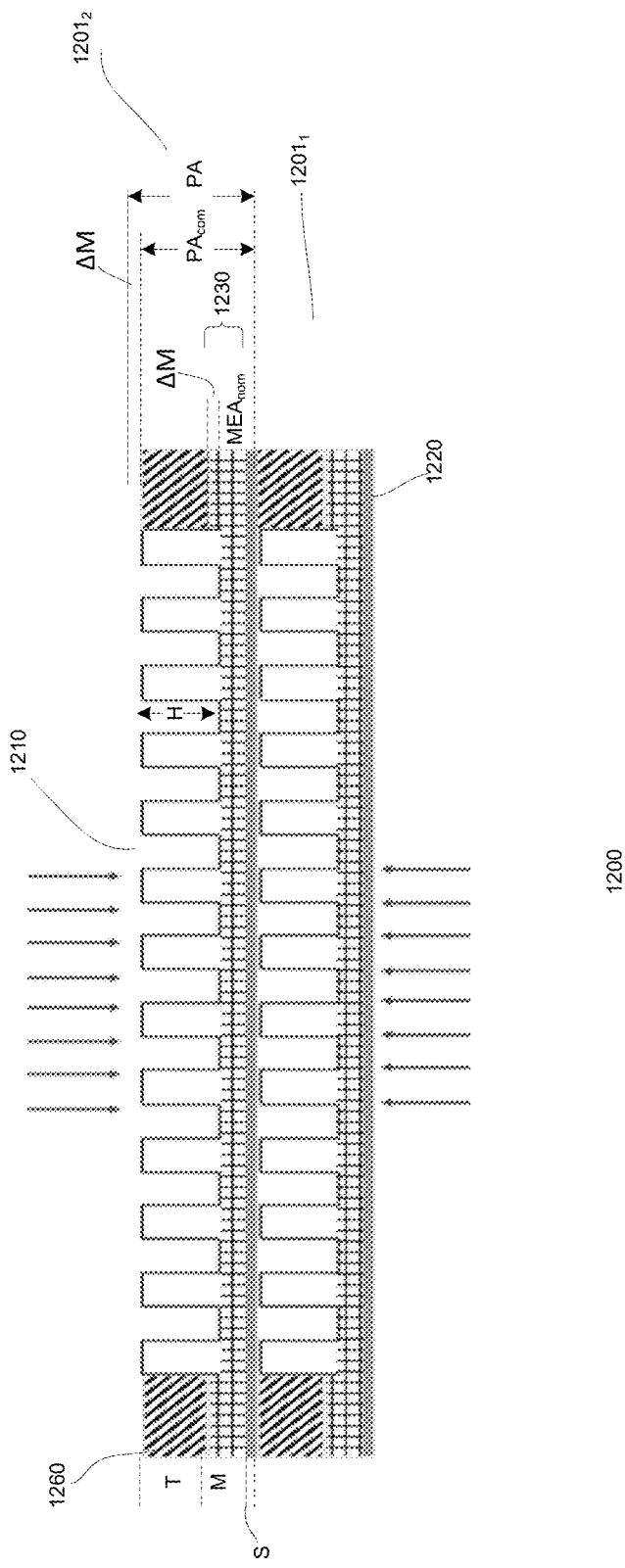

FIGS. 12A-12B illustrate 2 adjacent plate member assemblies 1201$_{1-2}$ of a fuel cell stack 1200 prior to and after the application of compressive force. Referring to FIG. 12A, a plate member assembly includes alignment parts 1260 at both ends of a corrugated sheet 1210. In the exemplary embodiment, an MEA 1230 of a plate member assembly is attached to a bottom surface of the alignment parts. For example, a top surface of the MEA is attached to the bottom surface of the alignment parts. A separator sheet 1220 is attached to the bottom surface of the MEA. For example, a top surface of the separator sheet is attached to the bottom surface of the MEA. A separator sheet of an adjacent MEA, for example, is attached to the top surface of the alignment parts.

An alignment part has a thickness T, the MEA has a thickness M, the separator sheet has a thickness S and the corrugated sheet has a height H. As such, the uncompressed thickness of the plate member assembly PA is equal to H+M+S.

In FIG. 12B, a compressive force is applied to the plate member assemblies of the fuel cell stack. The compressive force pushes the corrugated channel sheet of a plate member assembly into the MEA. For example, the separator sheet of an adjacent plate member assembly pushes the corrugated channel sheet into the MEA of the plate member assembly. The height H of the corrugated channel sheet remains the same. In one embodiment, the compressive force results in the top of the corrugated channel sheet being flushed with the top surface of the alignment parts. For example, the top surface of the corrugated channel sheet of the lower plate member assembly is flushed with the top surface of the alignment parts of the lower plate member assembly; the top surface of the corrugated channel sheet of the upper plate member assembly is flushed with the top surface of the alignment parts of the upper plate member assembly.

In one embodiment, the thickness PA of a plate member assembly is reduced by $\Delta M$ to $PA_{com}$. For example, the MEA is compressed to a thickness $MEA_{com}$ by the corrugated channel sheet, where $M=MEA_{com}+\Delta M$. In one embodiment, H is slightly larger than T by $\Delta M$. For example, $\Delta M$ may be equal to $CR_{rec}$ or the range from $CR_{rec}+/-$the tolerance. For example, H is slightly larger than the T by $CR_{rec}$ or from $CR_{rec}+/-$the tolerance. This results in compression of the MEA by $\Delta M$ and the top surface of the corrugated channel sheet to be flushed with the top surface of the alignment parts. The compressed thickness $PA_{com}$ is equal to T+M+S.

In the exemplary embodiment, the apertures of the various parts of a fuel cell e.g., the plate member assembly, which includes the alignment parts, the MEA, the corrugated sheet and the separator sheet are well aligned. The aligned apertures form a continuous cylindrical shaped cavity within the fuel cell and act as an internal manifold/channel. Hydrogen gas may pass through this channel and is distributed evenly to the respective cells. As an example, this channel may be observed as the first fluid flow channel in one end of the stack of the cell stack 972. Excess hydrogen, when purged from the cells, exits through another similar manifold. It will be appreciated that other impurities within the fuel cell may also be purged via this manifold. As an example, this manifold/channel may be observed as the second fluid flow channel at another end of the stack of the cell stack 972. Due to the use of alignment parts, the exemplary embodiments may solve the problems arising from poor alignment in the fuel cell stack assembly. Poor alignment of the apertures within the fuel cell (bipolar plate, MEA, corrugated and separator sheet etc.) typically results in flow impediment of hydrogen gas. This lowers the performance of the stack due to reduced fuel intake. Poor alignment can also cause non-uniform distribution of hydrogen gas to each of the cells in the stack. This also results in lower overall performance due to a reduced stoichiometric number for cells with lower hydrogen intake.

The assembly process is simplified when a plate member of the exemplary embodiments is used. The alignment of the single cells is ensured since the rods (from an end plate) pass through the respective alignment holes (of alignment rings) of the plate members. By using the plate member of the described exemplary embodiments, good/accurate alignment of the fuel flow channels and the active areas of all the cells may be achieved. This benefits stack performance and increases aesthetic appeal of the cell stack.

In addition, by using two alignment parts in described exemplary embodiments, the length of the corrugated sheet may be reduced, when compared to the prevailing method in which the length of the corrugated sheet is typically the same as the length of a stack. The corrugated sheets may be coated with precious metals for corrosion resistance and are thus, relatively expensive. The cost of the stack may be reduced by replacing part of the corrugated sheet with less expensive material e.g., the alignment parts. Further, the sealing around the gas flow channels is also simplified and significantly enhanced since room/space is provided for the sealing components/materials.

The exemplary embodiments described herein may provide open cathode assemblies. There have been applications for closed cathode assemblies. Closed cathode assemblies are provided with oxidant flow channels and an external oxidant supply system. In comparison, open cathode assemblies operate in ambient air and are desirably less costly and less complex to manufacture than closed cathode assemblies. Open cathode assemblies also consume less parasitic power than closed cathode assemblies.

In other exemplary embodiments, the plate member may be integrated/assembled with a MEA before assembly into a cell stack.

Thus, in view of the above, the described exemplary embodiments may provide an integrated bipolar plate, which combines a corrugated sheet and a separator sheet, and that in turn provides alignment guidance or measures for sealing and alignment of multiple bipolar plates.

In the described exemplary embodiments, the corrugated sheet is described as rectangular in shape. However, it will be appreciated that the exemplary embodiments are not limited as such. For example, the corrugated sheet may be of any suitable shapes, such as circular in shape etc.

In the described exemplary embodiments, the cell stack is described primarily as a fuel cell stack. However, it will be appreciated that the exemplary embodiments are not limited as such and the exemplary embodiments may extend to providing plate members for a cell stack for other suitable purposes.

In the described exemplary embodiments, the plate member may be used as a bipolar plate. However, it will be appreciated that the exemplary embodiments are not limited as such and the exemplary embodiments may extend to providing plates for other suitable purposes.

In the described exemplary embodiments, the alignment member is described as an aperture. However, it will be appreciated that the exemplary embodiments are not limited as such and the alignment member may be, but is not limited to, a hole-projection arrangement such as having a projection projecting from the bottom surface of the alignment part to mate with a hole provided on the top surface of another alignment part stacked at the bottom surface of the alignment part.

The terms "coupled" or "connected" as used in this description are intended to cover both directly connected or connected through one or more intermediate means, unless otherwise stated.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Further, the term 'hole' as used in the description herein may refer to an aperture, and such terms may be used interchangeably in the description.

It will be appreciated by a person skilled in the art that other variations and/or modifications may be made to the specific embodiments without departing from the scope of the invention as broadly described. The present embodiments are, therefore, to be considered in all respects to be illustrative and not restrictive.

The invention claimed is:

1. A plate member for an open cathode fuel cell stack, the plate member comprising:
a corrugated channel sheet with opposing first and second side edges and opposing first and second end edges, the corrugated channel sheet comprising peaks and troughs extending from the first side edge to the second side edge, the troughs and the peaks form flow channels with openings at the first and second side edges, wherein the corrugated channel sheet comprises a corrugated channel sheet height H;
first and second alignment parts, wherein the first and second alignment parts each comprises
a main body having a through hole,
extensions on sides of the main body, wherein an extension includes an alignment hole,
an alignment part thickness T which is slightly lesser than H, and
wherein the main body includes an end engagement edge and the extensions include side engagement edges;
wherein the first alignment part is disposed at the first end edge of the corrugated channel sheet and the second alignment part is disposed at the second end edge of the corrugated channel sheet; and
wherein the first and second alignment parts comprise a rigid material to constrain the thickness of the plate member during assembly of a fuel cell stack comprising a plurality of plate members.

2. The plate member of claim 1 wherein the end engagement edge and the side engagement edges of the first and second alignment parts enable a tight fit of first and second end edge portions of the corrugated channel sheet to the first and second alignment parts.

3. The plate member of claim 1 wherein:
the first alignment part comprises
a first sealing part disposed from a first surface of the first alignment part, wherein the first sealing part surrounds the through hole of the first alignment part, and
a first sealing component disposed in the first sealing part; and the second alignment part comprises
a second sealing part disposed from a first surface of the second alignment part, wherein the second sealing part surrounds the through hole of the second alignment part, and
a second sealing component disposed in the second sealing part.

4. The plate member of claim 3 comprises a separator sheet having first and second separator sheet surfaces, the second separator sheet surface is disposed on a first surface of the first and second alignment parts and a first surface of the corrugated channel sheet, wherein the separator sheet includes
separator sheet through holes, wherein the separator sheet through holes are aligned with the through holes of the first and second alignment parts, and
wherein the first and second sealing components facilitate in forming an airtight coupling with the separator sheet and the first and second alignment parts.

5. The plate member of claim 4 comprises:
a membrane electrode assembly (MEA) having first and second MEA surfaces, wherein the first MEA surface is disposed on a second surface of the first and second alignment parts and a second surface of the corrugated channel sheet.

6. The plate member of claim 1 comprises:
a MEA having first and second MEA surfaces, wherein the first MEA surface is disposed on a second surface of the first and second alignment parts and a second surface of the corrugated channel sheet;
a separator sheet having first and second separator sheet surfaces, wherein the first separator sheet surface is disposed on the second MEA surface; and
wherein the first and second alignment parts, the corrugated channel sheet, the MEA and the separator sheet forms a plate member assembly.

7. The plate member of claim 6 wherein:
the separator sheet is edged sealed to the MEA; and
the first MEA surface serves as a cathode side of the MEA and the second MEA surface serves as an anode side of the MEA.

8. The plate member of claim 6 comprises
a second separator sheet having first and second separator sheet surfaces, the second separator sheet surface of the second separator sheet is disposed on a first surface of the first and second alignment parts and a first surface of corrugated channel sheet; and
wherein the second separator sheet is a separator sheet of an adjacent plate member assembly of the fuel cell stack with a plurality of stacked plate member assemblies.

9. The plate member of claim 8 wherein:
the first alignment part comprises
a first sealing part disposed from the first surface of the first alignment part, wherein the first sealing part surrounds the through hole of the first alignment part,
a first sealing component disposed in the first sealing part; and
the second alignment part comprises
a second sealing part disposed from the first surface of the second alignment part, wherein the sealing part surrounds the through hole of the second alignment part, and
a second sealing component disposed in the second sealing part; and
the first and second sealing components facilitate forming an airtight seal with the second separator sheet and the first and second alignment parts.

10. The plate member of claim 6 wherein:
the MEA is a compressible component of the plate member assembly having an uncompressed thickness M and a recommended compression rate $CR_{rec}$;
the separator sheet comprises a thickness S; and
wherein an uncompressed thickness PA of the plate member assembly is equal to H+M+S.

11. The plate member of claim 10 wherein the $CR_{rec}$ comprises a tolerance, wherein a minimum compression of the MEA is equal to $CR_{rec}$–tolerance and a maximum compression of the MEA is $CR_{rec}$+tolerance, wherein compression of the MEA below the minimum compression or above the maximum compression negatively impacts MEA performance or reliability.

12. The plate member of claim 11 wherein:
the plate member assembly is configured to have a compressed thickness $PA_{com}$ when assembled into the fuel cell stack, where the $PA_{com}$ is equal to about T+M+S; and
the MEA is compressed by the corrugated channel sheet pressing into the MEA, wherein the MEA is compressed to $CR_{rec}$+/−the tolerance.

13. The plate member of claim 11 wherein:
the plate member assembly is configured to have a compressed thickness $PA_{com}$ when assembled into the fuel cell stack, where $PA_{com}$ is equal to about T+M+S; and
the MEA is compressed by the corrugated channel sheet pressing into the MEA, wherein the MEA is compressed to the $CR_{rec}$.

14. The plate member of claim 1 wherein the first and second end edges comprise first and second end trough walls.

15. The plate member of claim 6, wherein the fuel cell stack comprises:
a bottom end plate, the bottom end plate comprising bottom end plate alignment holes;
a top end plate, the top end plate comprising top end plate alignment holes;
a plurality of plate member assemblies; and
wherein the alignment holes of the first and second alignment parts of the plurality of plate member assemblies are aligned to the top end plate alignment holes and the bottom end plate alignment holes to facilitate horizontal and vertical alignment of the fuel cell stack.

16. The plate member of claim 15, wherein the fuel cell stack comprises alignment rods which extend perpendicularly through the top end plate alignment holes of the top end plate, the alignment holes of the first and second alignment parts of the plurality of plate member assemblies, and the bottom end plate alignment holes.

17. A method of forming an open cathode fuel cell stack comprising:
providing a plurality of plate members, wherein a plate member comprises
a corrugated channel sheet with opposing first and second side edges and opposing first and second end edges, the corrugated channel sheet comprising peaks and troughs extending from the first side edge to the second side edge, the troughs and the peaks form flow channels with openings at the first and second side edges, wherein the corrugated channel sheet comprises a corrugated channel sheet height H,
first and second alignment parts, wherein the first and second alignment parts each comprises
a main body having a through hole,
extensions on sides of the main body, wherein an extension includes an alignment hole,
an alignment part thickness T which is slightly lesser than the corrugated channel sheet height H, and
wherein the main body includes an end engagement edge and the extensions include side engagement edges,
wherein the first alignment part is disposed at the first end edge of the corrugated channel sheet and the second alignment part is disposed at the second end edge of the corrugated channel sheet, wherein the end engagement edge and the side engagement edges of the first and second alignment parts enable a tight fit of first and second end edge portions of the corrugated channel sheet to the first and second alignment parts;
assembling the plurality of plate members into a stack, wherein assembling includes providing alignment posts through which the alignments holes of the plurality of plate members are passed through and applying a compressive force on the stack of plate members; and
wherein the first and second alignment parts of the plurality of plate members constrain the thickness of the plurality of plate members during assembly of the stack to avoid damaging the corrugated channel sheets of the plurality of plate members.

18. The method of claim 17 comprises:
providing a bottom end plate with a bottom main body having bottom assembly holes configured to be aligned with the alignment holes of the first and second alignment parts of the plurality of plate members, wherein the alignment posts are installed into the bottom assembly holes;
providing a top end plate with a top main body having top assembly holes configured to be aligned with the alignment holes of the first and second alignment parts of the plurality of plate members; and
installing the top end plate through the alignment posts and tightening the top end plate to apply compression pressure on the plurality of plate members.

19. A method of forming a plate member for an open cathode fuel cell stack comprising:
providing a corrugated channel sheet with opposing first and second side edges and opposing first and second end edges, the corrugated channel sheet comprising peaks and troughs extending from the first side edge to the second side edge, the troughs and the peaks form flow channels with openings at the first and second side edges;

providing first and second alignment parts, wherein the first and second alignment parts each comprises
  a main body having a through hole,
  extensions on sides of the main body, wherein an extension includes an alignment hole,
  wherein the main body includes an end engagement edge and the extensions include side engagement edges;
mating the end engagement edge of the first alignment part to the first end edge of the corrugated channel sheet; and
mating the end engagement edge of the second alignment part to the second end edge of the corrugated channel sheet.

20. The method of claim 19 comprises:
providing a MEA having first and second MEA surfaces;
providing a separator sheet having first and second separator sheet surfaces;
attaching the first separator sheet surface to the second MEA surface, wherein the separator sheet is edge sealed to the MEA;
attaching the first MEA surface to a second surface of the first and second alignment parts and a second surface of the corrugated sheet; and
wherein the first and second alignment parts, the corrugated sheet, the MEA and the separator sheet forms a plate member assembly.

\* \* \* \* \*